(12) United States Patent
Sanidas

(10) Patent No.: US 11,062,265 B1
(45) Date of Patent: Jul. 13, 2021

(54) SYSTEMS AND METHODS FOR LIFE PLAN GENERATION AND MANAGEMENT

(71) Applicant: State Farm Mutual Automobile Insurance Company, Bloomington, IL (US)

(72) Inventor: Tim G. Sanidas, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 17/122,630

(22) Filed: Dec. 15, 2020

Related U.S. Application Data

(60) Provisional application No. 62/949,155, filed on Dec. 17, 2019.

(51) Int. Cl.
| | |
|---|---|
| *H04L 29/08* | (2006.01) |
| *G06Q 10/10* | (2012.01) |
| *G06Q 30/06* | (2012.01) |
| *H04L 29/06* | (2006.01) |
| *G06Q 30/02* | (2012.01) |

(52) U.S. Cl.
CPC ............ *G06Q 10/10* (2013.01); *G06Q 30/02* (2013.01); *G06Q 30/0621* (2013.01); *H04L 67/02* (2013.01); *H04L 67/34* (2013.01); *H04L 67/42* (2013.01)

(58) Field of Classification Search
CPC .... G06Q 10/10; G06Q 30/02; G06Q 30/0621; H04L 67/02; H04L 67/34; H04L 67/42
See application file for complete search history.

(56) References Cited

U.S. PATENT DOCUMENTS

| | | | |
|---|---|---|---|
| 5,241,466 A | 8/1993 | Perry et al. | |
| 6,246,991 B1 | 6/2001 | Abe et al. | |
| 7,039,681 B2 | 5/2006 | Nolte et al. | |

(Continued)

FOREIGN PATENT DOCUMENTS

| | | |
|---|---|---|
| CN | 107358179 A | 11/2017 |
| EP | 3494566 A2 | 6/2019 |

(Continued)

OTHER PUBLICATIONS

Calendly, "The Best Life Planner Software", blog, published Apr. 15, 2020, 10 pages, Calendly, retrieved Dec. 14, 2020, URL: https://calendly.com/blog/life-planner-software/.

*Primary Examiner* — Viet D Vu
(74) *Attorney, Agent, or Firm* — Armstrong Teasdale LLP

(57) ABSTRACT

A life plan management (LPM) computing device for connecting consumers with producers is provided. The LPM computing device may be in communication with a client computing device and may include a processor. The processor may be programmed to i) receive user input including at least one goal, ii) analyze the at least one goal to determine a plurality of categories, iii) store the plurality of categories, iv) analyze at least one of the plurality of categories to determine a plurality of producers, v) store the plurality of producers, vi) generate an interactive life map including the at least one goal, and enabling the consumer to access the plurality of producers by navigating the life map to select the at least one goal and the at least one category, vii) and cause the interactive life map to be displayed on the client computing device.

20 Claims, 13 Drawing Sheets

(56) References Cited

U.S. PATENT DOCUMENTS

| | | | |
|---|---|---|---|
| 7,454,379 B1 | 11/2008 | Wolzenski et al. | |
| 7,818,233 B1 * | 10/2010 | Sloan | G06Q 40/06 705/36 R |
| 10,467,663 B1 * | 11/2019 | Ocampo | G06Q 30/0279 |
| 10,636,103 B2 | 4/2020 | Molinsky et al. | |
| 2002/0019744 A1 | 2/2002 | Yamamoto | |
| 2002/0052768 A1 | 5/2002 | Walker et al. | |
| 2003/0163483 A1 | 8/2003 | Zingher et al. | |
| 2003/0182290 A1 | 9/2003 | Parker | |
| 2003/0212611 A1 | 11/2003 | Barrott et al. | |
| 2007/0156558 A1 | 7/2007 | Wolzenski et al. | |
| 2013/0046702 A1 * | 2/2013 | Ross | G06Q 40/06 705/319 |
| 2013/0166466 A1 | 6/2013 | Sanger | |
| 2014/0067712 A1 * | 3/2014 | Prasad | G06Q 40/06 705/36 R |
| 2016/0162992 A1 * | 6/2016 | England | G06Q 40/06 705/36 R |
| 2020/0258177 A1 | 8/2020 | Molinsky et al. | |
| 2020/0320894 A1 * | 10/2020 | Davidson | G09B 19/00 |
| 2020/0380597 A1 * | 12/2020 | Furbish | G06Q 40/02 |

FOREIGN PATENT DOCUMENTS

| | | |
|---|---|---|
| JP | 2003067470 A | 3/2003 |
| JP | 2011022948 A | 2/2011 |
| KR | 2013032944 A | 4/2013 |
| WO | 2011059840 A2 | 5/2011 |
| WO | 2018029533 A2 | 2/2018 |

\* cited by examiner

SYSTEMS AND METHODS FOR LIFE PLAN GENERATION AND MANAGEMENT

CROSS-REFERENCE TO RELATED APPLICATIONS

This application claims the benefit of priority of U.S. Provisional Patent Application Ser. No. 62/949,155, filed Dec. 17, 2019 and entitled "Life Plan Management Platform," the contents of which are hereby incorporated by reference, in their entirety and for all purposes, herein.

FIELD OF THE INVENTION

The present disclosure relates to life plan management platforms and, more particularly, to systems and methods for using a life plan management platform that enables users to dynamically generate and maintain a life map, and to interface with producers to help realize goals included in the life map.

BACKGROUND

At least some conventional computer networks (e.g., matching platforms) have enabled consumers to be matched with producers. However, conventional systems usually merely match consumers with producers, and may not provide additional functionality. Further, in the known systems, consumers may not be able to dynamically control their profile and goals to better match themselves with particular producers. Known systems may have other drawbacks as well.

BRIEF SUMMARY

The present embodiments may relate to systems and methods for electronically connecting consumers with producers. The system may include a life plan management computing device, one or more third party servers, one or more client devices, and/or one or more databases. In one aspect, the consumer flow of interfacing with a life plan management (LPM) computing device may start with the creation of a life map, which is comprised of a series of goals. Once a goal is selected, there may be links to associated categories, subcategories, and producers displayed to the user, as discussed further herein.

In one aspect, a life plan management (LPM) computing device for connecting consumers with producers is provided. The LPM computing device is in communication with a client computing device and includes at least one processor in communication with at least one memory device. The at least one processor is programmed to i) receive user input from the client computing device, the user input including at least one goal icon selected by the consumer, ii) analyze the at least one goal to determine a plurality of categories associated with the at least one goal, iii) store, in the at least one memory device, the plurality of categories in association with the at least one goal, iv) analyze at least one of the plurality of categories to determine a plurality of producers associated with the at least one category, v) store, in the at least one memory device, the plurality of producers in association with the at least one category, vi) generate an interactive life map for the consumer, the interactive life map including the at least one goal, and enabling the consumer to access the plurality of producers by navigating the life map to select the at least one goal and the at least one category, vii) and cause the interactive life map to be displayed on the client computing device. The LPM computing device may include additional, less, or alternate functionality, including that discussed elsewhere herein.

In another aspect, a computer-implemented method for connecting consumers with producers is implemented using a life plan management (LPM) computing device in communication with a client computing device. The LPM computing device includes at least one processor in communication with at least one memory device. The method includes i) receiving user input from the client computing device, the user input including at least one goal for the consumer, ii) analyzing the at least one goal to determine a plurality of categories associated with the at least one goal, iii) storing, in the at least one memory device, the plurality of categories in association with the at least one goal, iv) analyzing at least one of the plurality of categories to determine a plurality of producers associated with the at least one category, v) storing, in the at least one memory device, the plurality of producers in association with the at least one category, vi) generating an interactive life map for the consumer, the interactive life map including the at least one goal, and enabling the consumer to access the plurality of producers by navigating the life map to select the at least one goal and the at least one category, and vii) causing the interactive life map to be displayed on the client computing device. The method may include additional, less, or alternate actions, including those discussed elsewhere herein.

In a further aspect, a life plan management (LPM) computing device is provided. The LPM computing device includes at least one processor in communication with at least one memory device. The LPM computing device is in communication with a client computing device. The at least one processor is programmed to i) cause a plurality of goal icons to be displayed on the client computing device, where each goal icon of the plurality of goal icons is associated with a goal of a plurality of goals, ii) receive user input from the client computing device, the user input including at least one goal icon selected by a consumer associated with the client computing device, iii) determine at least one goal associated with the selected at least one goal icon; iv) generate an interactive life plan for the consumer, the life plan including the at least one goal, and one or more steps for the consumer to achieve the at least one goal; and v) cause the interactive life plan to be displayed on the client computing device. The LPM computing device may include additional, less, or alternate functionality, including that discussed elsewhere herein.

In a still further aspect, a computer-implemented method for connecting consumers with producers is provided. The method is implemented using a life plan management (LPM) computing device including at least one processor in communication with at least one memory device. The LPM computing device is in communication with a client computing device. The method includes i) causing a plurality of goal icons to be displayed on the client computing device, where each goal icon of the plurality of goal icons is associated with a goal of a plurality of goals, ii) receiving user input from the client computing device, the user input including at least one goal icon selected by a consumer associated with the client computing device, iii) determining at least one goal associated with the selected at least one goal icon, iv) generating an interactive life plan for the consumer, the life plan including the at least one goal, and one or more steps for the consumer to achieve the at least one goal, and v) causing the interactive life plan to be displayed on the client computing device. The method may include additional, less, or alternate actions, including those discussed elsewhere herein.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
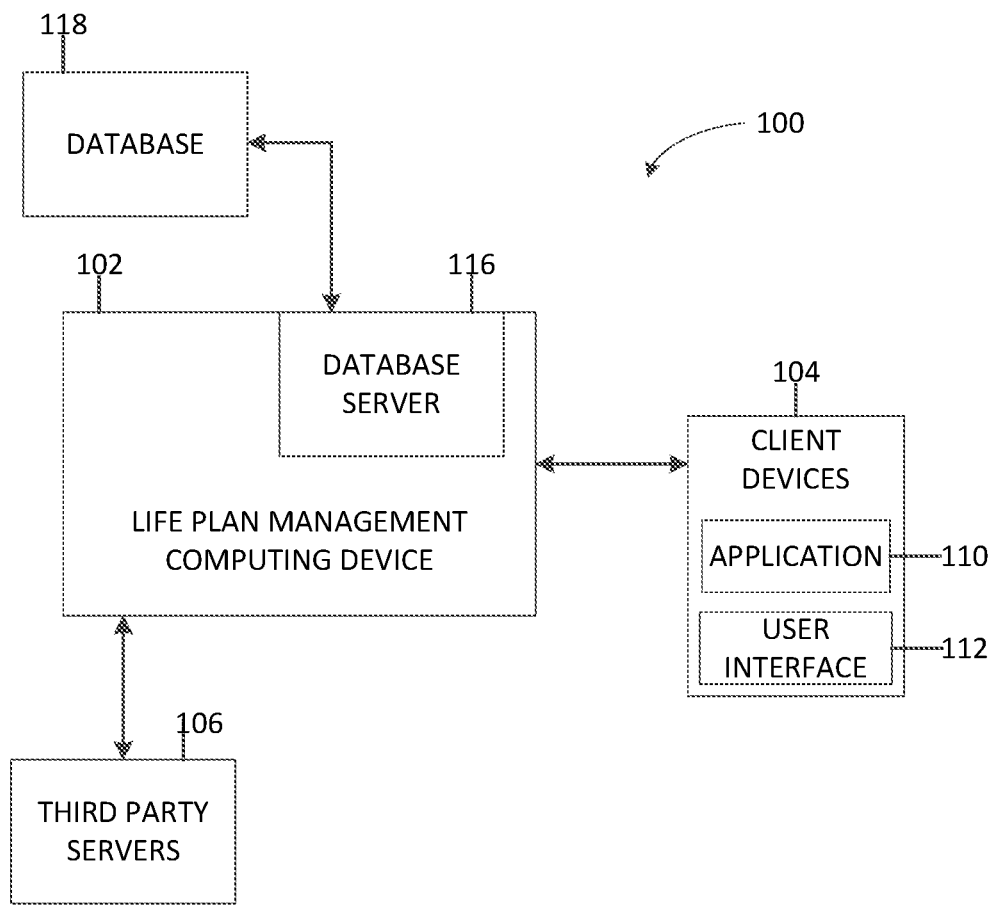
FIG. 1 illustrates an exemplary life plan management computer system for electronically connecting consumers to producers in accordance with the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for connecting consumers with producers to facilitate achieving goals associated with the consumers. In one exemplary embodiment, the process may be performed by a life plan management (LPM) computer system (also referred to herein as a LPM platform (LPMP)). In one aspect, the consumer flow of interfacing with a life plan management (LPM) computing device may start with the creation of a life map, which is comprised of a series of goals. Once a goal is selected, there may be links to associated categories, subcategories, and producers displayed to the user, as discussed further herein. As used herein, a producer is a provider of goods or services that will help the consumer in achieving one or more steps to their goals.

As described below, the systems and methods described herein may leverage data aggregation and machine learning techniques to identify producers and products that may help a consumer in achieving their goals. The systems and methods described herein may automatically determine suggested actions to help the consumer, and provide those suggested actions to the consumer as alerts. Accordingly, the systems and methods described herein ensure that consumers are quickly connected with producers and products that will assist them in realizing their goals.

Exemplary Life Plan Management Platform

The systems and methods described herein may be implemented using a life plan management platform (LPMP). As used herein, a 'platform' may refer to a computer-implemented environment that facilitates exchanging value between producers (which may also be referred to as providers) and consumers. For example, at least some known platforms may enable both retail sales and third party marketplace sales using e-commerce. Platforms may include a marketplace, a runtime environment, and a tool kit.

The marketplace of a platform may facilitate the exchange of value. For example, the marketplace may be what attracts both consumers and producers to the platform. As more consumers join the platform, more producers are likely to join the platform. Further, as more producers join the platform, more consumers are likely to join the platform. The runtime environment of the platform may be the technology that enables consumers and products to participate in the platform. Further, the tool kit of the platform may enable parties to add value to the platform.

Successful platforms may generally encourage third parties to support the platform, which results in faster time to market, increased collaboration, and increased partnership opportunities. This may attract and leverage creative talent from multiple sources, create new monetization opportunities, and reduce friction for both consumers and producers.

The LPMP, as described herein, may assist consumers in discovering their goals and aspirations, where they want to be in life, and what services they need to get there. The marketplace for the LPMP may have a digital hub (e.g., a web platform) that interfaces with client computing devices at physical locations, such as retail or consumer outreach locations. Further, the runtime environment for the LPMP may be cloud scalable, and may support big data analytics and artificial intelligence (AI). For example, regarding big data analytics, the runtime environment may process high volumes, varieties, and velocities of data to enable collecting more data, achieving better analytics, generating better products, and attracting more customers (which itself necessarily results in more data). The runtime environment may also be application programming interface (API) extendable, and may support a personalized e-commerce experience for consumers. The runtime environment may also support secure multi-party computation capabilities.

The tool kit for the LPMP may include, for example, discovery, integration, incubation, release and deploy, and/or analytical tools. For example, the tool kit may include a discover tool that provides an environment that allows producers to discover consumer needs that are not being met within the current marketplace on the LPMP. The tool kit may also include an integration tool that provides an environment that allows producers to easily integrate products into the marketplace implemented using LPMP. The tool kit may also include an incubation tool that provides an incubation environment that provides producers with a full suite of software and data development and deployment tools. The tool kit may also include a release and deploy tool that provides for an orchestrated release and deployment pipeline for products, and allows for all various functions (e.g., applications, infrastructure, database, security, compliance, etc.) to persist as code. This may allow producers to continuously deploy products on the LPMP. The tool kit may also include an analytics tool that provides a self-service analytics environment that allows producers to monitor costs, product usage, consumer feedback, and/or digital behavior.

For producers, the LPMP may provide access to a large, established consumer base, and access to a large trusted workforce to facilitate the sale of products to consumers. Further, the LPMP may drive innovation through access to secure consumer behavioral data through consumers' digital avatars. This behavioral data may be provided (with permission from the consumer) to producers via the tool kit with total transparency. Using the tool kit, producers may also access secure product usage events to understand the competitive landscape, and may access secure consumer feedback events to understand product enhancement opportunities.

For the party operating the platform, the LPMP may provide an understanding of consumer behavior through their digital actions. The LPMP may also provide a mechanism to discover the next generation of products that meet consumer needs, and may enable product innovation through a blending of industries. Further, the LPMP may establish long term consumers, providing long term value.

Exemplary Life Maps

As explained above, the LPMP may enable a consumer to generate, maintain, and update a dynamic life map. The life map is a digital, actionable life map created by the consumer and personalized to the consumer. Using the life map generated on the LPMP, the consumer can explore their goals and aspirations, where they want to be in life, and what services they need to get there. In the exemplary embodiment, the consumer interacts with the life map digitally over the LPMP (e.g., using a client computing device). Alternatively, the consumer may interact with a physical version of the life map (e.g., a version downloaded from the LPMP). For example, the consumer may meet with a coach to generate and/or review the physical version of the life map.

To make the life map actionable, third party producers (e.g., parties other than the consumer and the operator of the LPMP) may provide products through the LPMP. Producers may have a partnership with the operator of the LPMP for existing products. Alternatively, or additionally, producers may use the LPMP as a development environment to drive generation of new, innovative products. Accordingly, the platform may serve as an incubation environment for new businesses/start-ups in some embodiments.

In the exemplary embodiment, actions on the life map may be enabled through the generation and maintenance of a digital data footprint or "avatar" that corresponds to the consumer. The avatar may be an event rich, secure data object that is fully managed by the consumer. As part of the functionality of the LPMP, insights gained from data (e.g., derived using any suitable level of data analytics) may be used to match producers and/or products, at the appropriate time, to the appropriate consumer.

Further, a consumer may receive dynamic notifications from the LPMP when an event occurs that impacts one or more goals in the consumer's life map. For example, notifications may be generated when events help achieve goals or delay goals in the life map. Further, notifications may be generated when goals in the life map reach fulfillment. The goals may also be broken down further into steps, actions, and/or milestones to assist the consumer in achieving or completing the goal. Each milestone may represent the completion of a series of steps and/or actions.

In the exemplary embodiment, the LPMP may enable a consumer to develop a life map, independent of and unbounded by product offerings from producers. Further, the LPMP may allow consumers to access a variety of products, within the context of their life plans, as defined and managed by them. Through the LPMP, the consumer may access an experience that can be fully or partially digital, and can be enhanced by users that are familiar with the consumer's geographic area. Further, the consumer can use the LPMP to manage and utilize their avatar as they see fit, including monetizing their avatar. In the exemplary embodiment, participation in the LPMP may avoid generating advertisements. Further, the LPMP may not include marketplace bias based on products selected by consumers.

Exemplary Feedback Through the LPMP Platform

Through the LPMP, the consumer may receive feedback, including advice, guidance, and motivation from a plurality of sources. For example, consumers may receive feedback from users associated with the operator of the LPMP. For example, in some embodiments, the LPMP may be operated by an insurance provider. In such embodiments, the consumers may receive feedback from agents, policyholders, accountholders, and/or employees of the insurance provider.

In addition, consumers may also receive feedback from their friends and family. Specifically, the LPMP may interface with a social media network, enabling the consumer to post, upload, and/or otherwise share information regarding their life map and the goals within their life map. Friends and family may review the shared information and provide feedback, through the social media network and/or through the LPMP. The shared information can include, but is not limited to, personal stories, articles, videos, checklists, and testimonials.

Notably, through the LPMP, consumers may have the ability to analyze their own avatar, discover insights regarding their life map, and share their insights with a community. The community may include other consumers, individuals associated with the operator of the LPMP, and/or individuals associated with the producers. This functionality may enable consumers to become producers themselves, which may generate non-expected results that add value to the LPMP.

Further, a consumer may receive dynamic notifications from the LPMP when an event occurs that impacts one or more goals in the consumer's life map. For example, notifications may be generated when events help achieve goals or delay goals in the life map. Further, notifications may be generated when goals in the life map reach fulfillment.

Exemplary Producers and Products on the LPMP Platform

Using the LPMP platform, consumers may be matched to producers to enable access to products that assist the consumers in fulfilling goals in their respective life maps. As used herein, a producer is a provider of goods or services that will help the consumer in achieving one or more steps to their goals. That is, producers may focus on providing products and/or services that make goals easier to accomplish, or that mitigate events that prevent goals from happening. In the exemplary embodiment, producers may provide products and/or services that fall into one or more of the following categories: budget, savings, income generation, protection of assets, protection of health, community interaction, and building and maintaining relationships. For example, a producer can be an individual or company that provides financial services and advice on using those financial services. Those of skill in the art will appreciate that any suitable categories may be used. Once sufficient data is collected for the consumer (e.g., behavioral, usage, and/or feedback data) through the consumer's interactions with the LPMP platform, the focus of products and services provided to the consumer may shift.

For example, products associated with the budget, savings, and/or income generation categories may include checking and savings products, certificate of deposit (CD) products, credit card products, vehicle loan products, home mortgage loan products, home equity products, education savings plan products, retirement and IRA products, mutual fund products, annuity products, life insurance products, community offer products, home energy usage products, peer to peer car sharing products, etc. Further, example protection of assets products may include automobile insurance products, motorcycle insurance products, sport and leisure vehicle insurance products, identity restoration products, life insurance products, health insurance products, disability insurance products, liability insurance products, small business insurance products, estate planning products, appliance failure detection products, fire hazard detection products, home security products, power system products, etc.

Protection of health products may include elderly home monitoring products, health lifestyle support products, health monitoring products, etc. In addition, community interaction products may include community outreach and volunteering products, community grant products, community safety products, educational grant products, marketing sponsorship products, non-profit assistance products, etc.

Those of skill in the art will appreciate that the above listed products are merely examples, and that LPMP may enable consumers to access any suitable product that facilitates fulfilling goals in their respective life maps.

Exemplary Life Plan Management System

FIG. 1 depicts a view of an exemplary life plan management ("LPM") system 100 that may be used to implement the LPMP described herein. In the exemplary embodiment, LPM system 100 may be used in matching a user, or consumer, with a provider, or producer, based upon a life map generated by the consumer and additional data. LPM system 100 may include an LPM computing device 102. In some embodiments, LPM computing device 102 may be a server system.

In the exemplary embodiment, LPM computing device 102 is in communication with client devices 104 and third party servers 106. LPM computing device 102 is also in communication with a database 118 and may communicate with database 118 through a database server 116. In some embodiments, database server 116 is a component of LPM computing device 102. In other embodiments, database server 116 is separate from LPM computing device 102. In some embodiments, LPM system 100 may include a plurality of LPM computing devices 102, client devices 104, third party servers 106, and/or databases 118.

In the exemplary embodiment, client devices 104 may be computers that include a web browser or a software application, which enables client devices 104 to access remote computer devices, such as LPM computing device 102, using the Internet or other network. More specifically, client devices 104 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client devices 104 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. Further, LPM computing device 102 may be communicatively coupled to client devices 104 and may receive information from client devices 104. Client devices 104 may be operated, for example, by consumers and/or producers using the LPMP.

In the exemplary embodiment, LPM computing device 102 may interact with third party servers 106 associated with third parties that provide products. For example, LPM computing device 102 may communicate with an application associated with third party servers 106 to provide products for browsing and purchase by a consumer. LPM computing device 102 and third party servers 106 may be communicatively coupled to one another through the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

Database server 116 may be communicatively coupled to database 118 that stores data. In the exemplary embodiment, database 118 may be stored remotely from LPM computing device 102. In some embodiments, database 118 may be decentralized. In the exemplary embodiment, a user, such as a consumer or a producer, may access database 118 via their respective client devices 104 by logging onto LPM computing device 102, as described herein.

In the exemplary embodiment, client devices 104 include an LPM application 110 and a user interface 112. User interface 112 may be used, for example, to receive notifications from LPM computing device 102 and/or to input and verify information to be sent to LPM computing device 102. LPM application 110 may be, for example, a program or application that runs on client device 104.

In some embodiments, LPM application 110 is accessed remotely by client device 104. LPM application 110 may be hosted by or stored on LPM computing device 102 and accessed by client device 104. For example, LPM application 110 may be stored on and executed by LPM computing device 102. Client device 104 may provide inputs to LPM computing device 102 via a network which are used by LPM computing device 102 to execute LPM application 110. In one embodiment, these inputs may be received by a website hosted by LPM computing device 102. The website may further provide output to client device 104. Client device 104 used by the user (e.g., a consumer or producer) has access to a website (e.g., hosted by LPM computing device 102), application (e.g., LPM application 110), or other tool which the user uses to interact with the LPMP. LPM system 100 may be configured with additional, less, or alternate functionality, including that discussed elsewhere herein.

Exemplary User Computer Device

Figure 2:
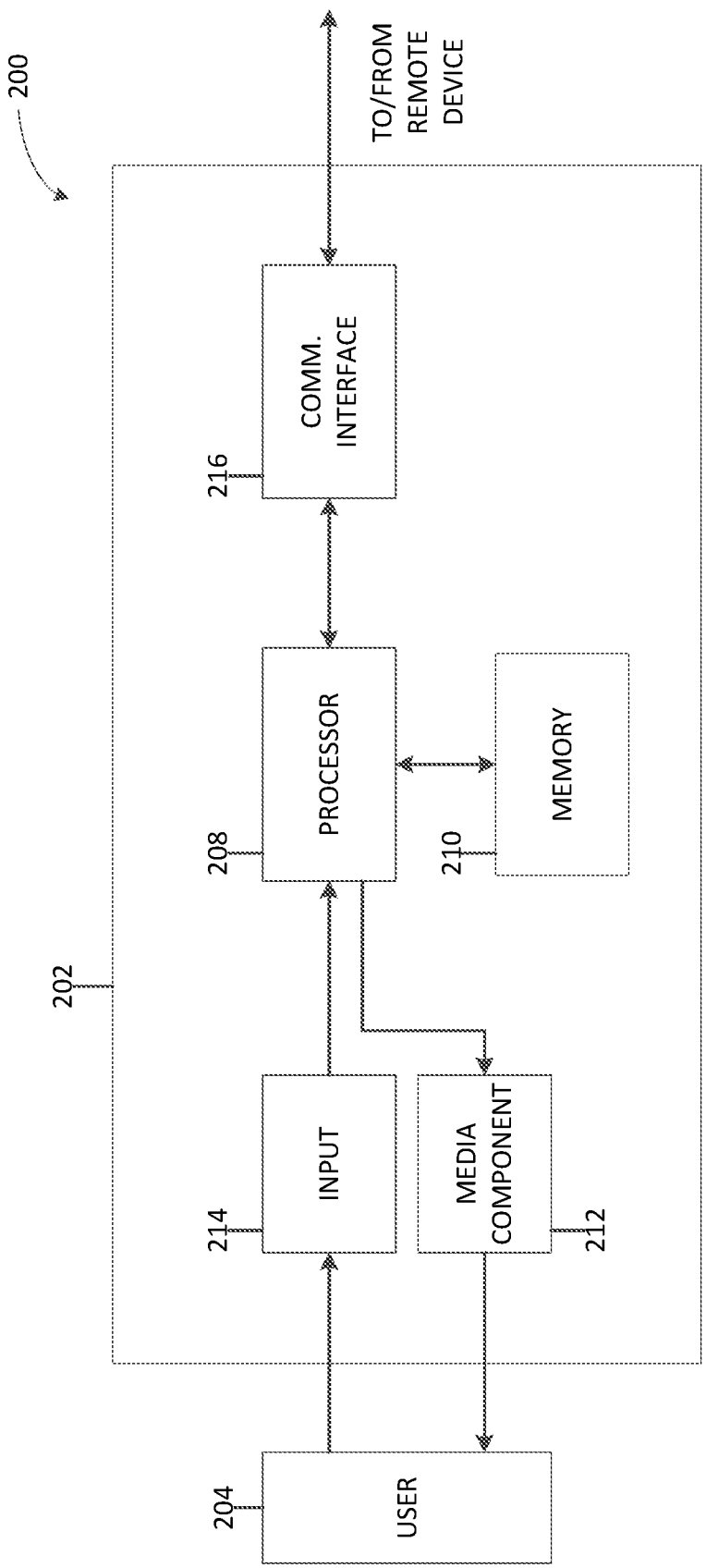
FIG. 2 illustrates an exemplary configuration of an exemplary user computing device that may be used in the life plan management computer system illustrated in FIG. 1.

FIG. 2 illustrates an exemplary configuration 200 of an exemplary user computing device 202. In some embodiments, user computing device 202 may be in communication with a multi-sided match making computing device (such as LPM computing device 102, shown in FIG. 1). User computing device 202 may be representative of, but is not limited to client devices 104 and/or third party servers 106. For example, user computing device 202 may be a mobile device, smartphone, tablet, smartwatch, wearable electronic, laptop, desktop, or another type of computing device associated with an account holder (e.g., a consumer).

User computing device 202 may be operated by a user 204 (e.g., a user of LPM system 100, shown in FIG. 1). User computing device 202 may receive input from user 204 via an input device 214. User computing device 202 includes a processor 208 for executing instructions. In some embodiments, executable instructions may be stored in a memory area 210. Processor 208 may include one or more processing units (e.g., in a multi-core configuration), and processor 208 may include, be in communication with, and/or be associated with one or more transceivers (not specifically shown). Memory area 210 may be any device allowing information such as executable instructions and/or user and registration data to be stored and retrieved. Memory area 210 may include one or more computer-readable media.

User computing device 202 also may include at least one media output component 212 for presenting information to user 204. Media output component 212 may be any component capable of conveying information to user 204 and may be used to at least partially implement user interface 112 (shown in FIG. 1). In some embodiments, media output component 212 may include an output adapter (not shown), such as a video adapter and/or an audio adapter. An output adapter may be operatively coupled to processor 208 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones).

In some embodiments, media output component 212 may be configured to present a graphical user interface (e.g., a web browser and/or a client application) to user 204. A graphical user interface may include, for example, a life map for user 204 and/or an avatar dashboard for user 204.

In some embodiments, user computing device 202 may include input device 214 for receiving input from user 204. User 204 may use input device 214 to, without limitation, interact with LPM system 100 (e.g., using LPM application 110), LPM computing device 102, or any of client devices 104 and third party servers 106 (shown in FIG. 1). Input device 214 may include, for example, a keyboard, a pointing device, a mouse, a stylus, and/or a touch sensitive panel (e.g., a touch pad or a touch screen) and may be used to at least partially implement user interface 112 (shown in FIG. 1). A single component, such as a touch screen, may function as both an output device of media output component 212 and input device 214. User computing device 202 may further include at least one sensor, including, for example, a gyroscope, an accelerometer, a position detector, a biometric input device, and/or an audio input device. In some embodiments, at least some data collected by user computing device 202 may be transmitted to LPM computing device 102. In the exemplary embodiment, data collected by user computing device 202 may be included a life map.

User computing device 202 may also include a communication interface 216, communicatively coupled to any of LPM computing device 102, client devices 104, and third party servers 106. Communication interface 216 may include, for example, a wired or wireless network adapter and/or a wireless data transceiver for use with a mobile telecommunications network.

Stored in memory area 210 may be, for example, computer-readable instructions for providing a user interface to user 204 via media output component 212 and, optionally, receiving and processing input from input device 214. The user interface may include, among other possibilities, a web browser and/or a client application. Web browsers enable users, such as user 204, to display and interact with media and other information typically embedded on a web page or a website hosted by LPM computing device 102 and/or client device 104. A client application may allow user 204 to interact with, for example, any of LPM computing device 102, client devices 104, and third party servers 106. For example, instructions may be stored by a cloud service and the output of the execution of the instructions sent to the media output component 212. User computing device 202 may include additional, less, or alternate functionality, including that discussed elsewhere herein.

Exemplary Server Device

Figure 3:
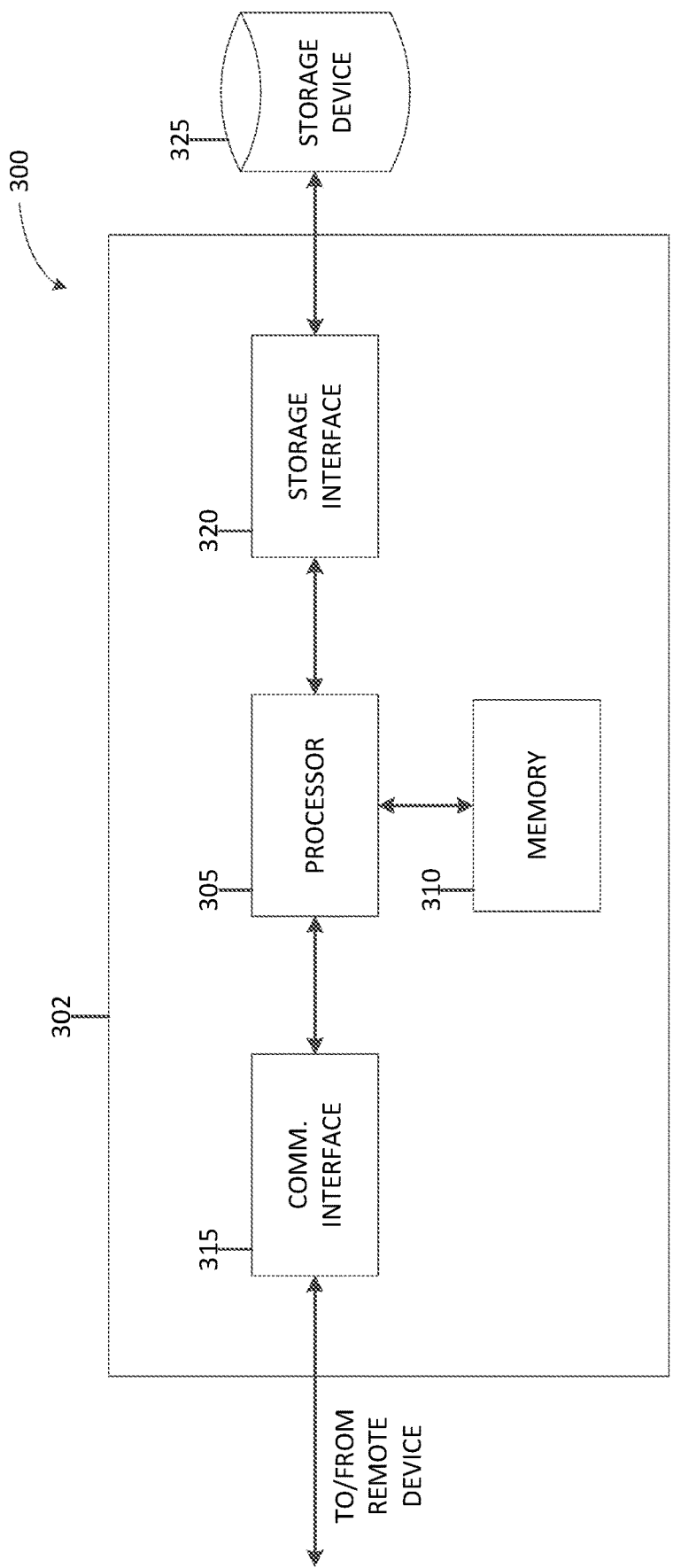
FIG. 3 illustrates an exemplary configuration of an exemplary server computing device that may be used in the life plan management computer system illustrated in FIG. 1.

FIG. 3 depicts an exemplary configuration 300 of an exemplary server computing device 302, in accordance with one embodiment of the present disclosure. Server computer device 302 may include, but is not limited to, LPM computing device 102 (shown in FIG. 1). Server computer device 302 may include a processor 305 for executing instructions. Instructions may be stored in a memory area 310. Processor 305 may include one or more processing units (e.g., in a multi-core configuration), and processor 305 may include, be in communication with, and/or be associated with one or more transceivers (not specifically shown).

Processor 305 may be operatively coupled to a communication interface 315 such that server computer device 302 may be capable of communicating with a remote device such as another server computer device 302 or a user computing device, such as client device 104 (shown in FIG. 1). For example, communication interface 315 may receive requests from or transmit requests to client devices 104 via the Internet.

Processor 305 may also be operatively coupled to a storage device 325. Storage device 325 may be any computer-operated hardware suitable for storing and/or retrieving data, such as, but not limited to, data associated with database 118 (shown in FIG. 1). In some embodiments, storage device 325 may be integrated in server computer device 302. For example, server computer device 302 may include one or more hard disk drives as storage device 325. In other embodiments, storage device 325 may be external to server computer device 302 and may be accessed by a plurality of server computer devices 302. For example, storage device 325 may include a storage area network (SAN), a network attached storage (NAS) system, and/or multiple storage units such as hard disks and/or solid state disks in a redundant array of inexpensive disks (RAID) configuration.

In some embodiments, processor 305 may be operatively coupled to storage device 325 via a storage interface 320. Storage interface 320 may be any component capable of providing processor 305 with access to storage device 325. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 325.

Processor 305 executes computer-executable instructions for implementing aspects of the disclosure. In some embodiments, processor 305 may be transformed into a special purpose microprocessor by executing computer-executable instructions or by otherwise being programmed.

Exemplary Computer-Implemented Method

Figure 4:
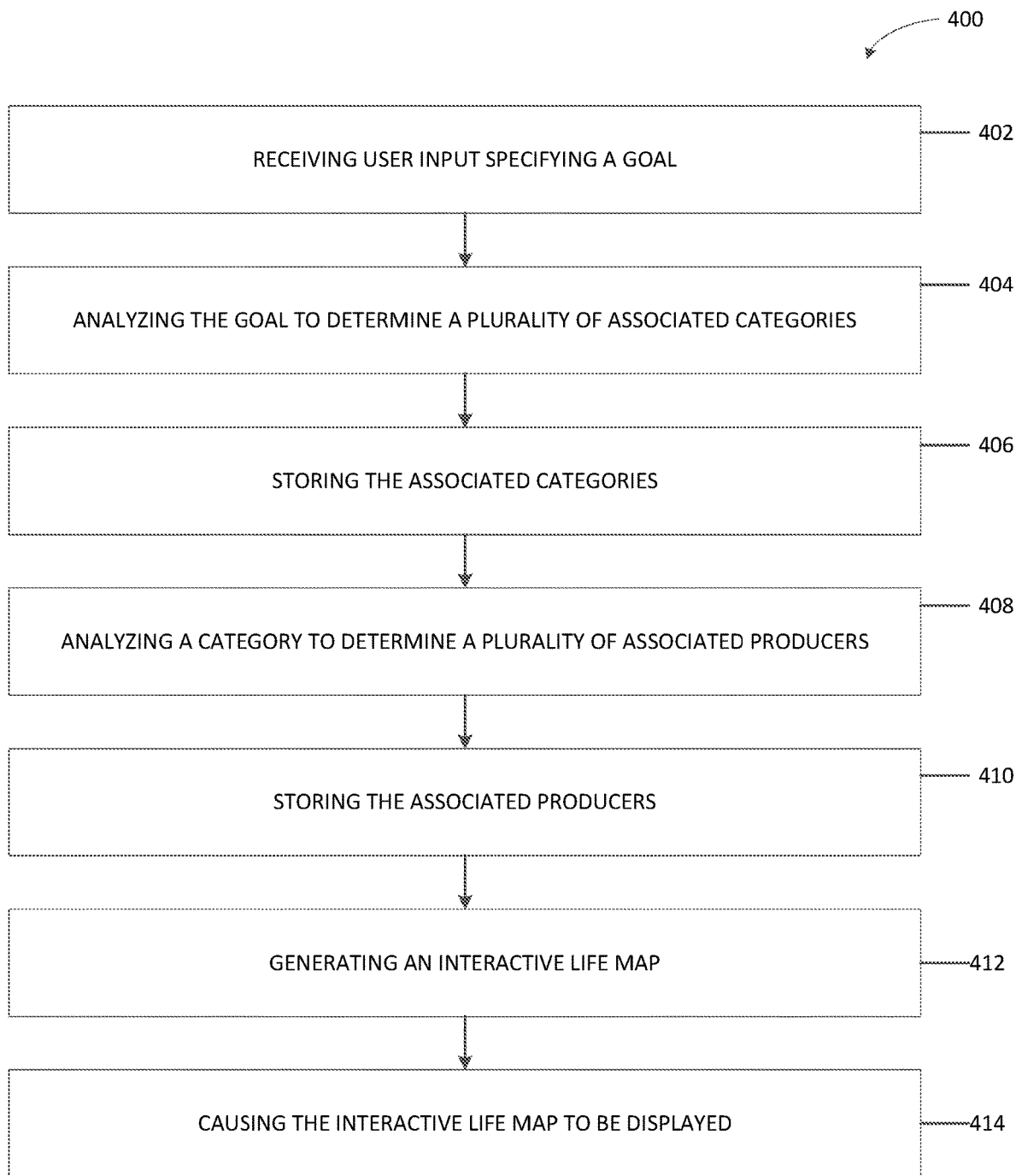
FIG. 4 illustrates a flow chart of an exemplary computer-implemented method implemented by the exemplary life plan management computer system shown in FIG. 1.

FIG. 4 depicts a flow chart illustrating a computer-implemented method 400 for connecting consumers with producers. In the exemplary embodiment, method 400 may be implemented by a life plan management computing device such as LPM computing device 102 (shown in FIG. 1).

Method 400 may include receiving 402 user input from a client computing device (e.g., client device 104 shown in FIG. 1), the user input including at least one goal for the consumer. Method 400 may also including analyzing 404 the at least one goal to determine a plurality of categories associated with the at least one goal, and a plurality of sub-categories associated with each category. Method 400 may further include storing 406 the plurality of categories and sub-categories in association with the at least one goal in a memory device (e.g., database 118 shown in FIG. 1). Method 400 may further include analyzing 408 at least one of the plurality of categories and/or subcategories to determine a plurality of producers associated with the at least one category and/or sub-category, and storing 410, in the at least one memory device, the plurality of producers in association with the at least one category and/or sub-category.

Further, method 400 may include generating 412 an interactive life map for the consumer. The interactive life map may include the at least one goal, and may enable the consumer to access the plurality of producers by navigating the life map to select the at least one goal and the at least one category and/or sub-category. Life maps, goals, categories, sub-categories, and producers are described below in detail. Method 400 may further include causing 414 the interactive life map to be displayed on the client computing device. Method 400 may include additional, less, or alternate actions, including those discussed elsewhere herein.

For instance, as mentioned elsewhere herein, in one aspect, the consumer flow of interfacing with a life plan management (LPM) computing device may start with the creation of a life map, which is comprised of a series of goals. Once a goal is selected, there may be links to associated categories, sub-categories, and producers displayed to the user, as discussed further herein. In some embodiments, the LPM computing device may generate an appointment for the consumer to meet with a representative of the producer.

Exemplary Computer Device

Figure 5:
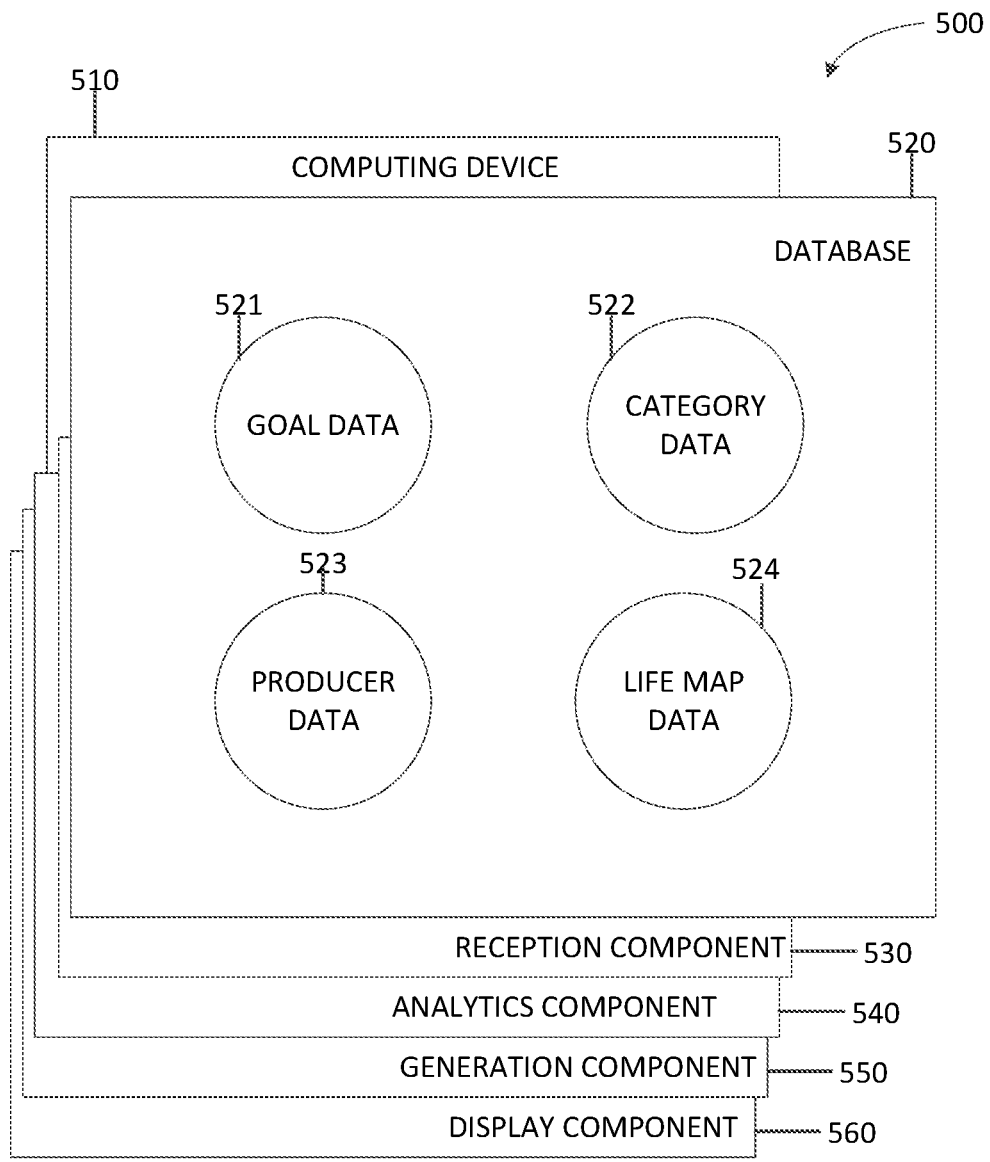
FIG. 5 illustrates a diagram of components of one or more exemplary computing devices that may be used in the life plan management computer system shown in FIG. 1.

FIG. 5 depicts a diagram 500 of components of one or more exemplary computing devices 510 that may be used in LPM system 200 (shown in FIG. 1). In some embodiments, computing device 510 may be similar to LPM computing device 102 (shown in FIG. 1). Database 520 may be coupled with several separate components within computing device 510, which perform specific tasks. In this embodiment, database 520 may include goal data 521, category data 522, producer data 523, and life map data 524. In some embodiments, database 520 is similar to database 118 (shown in FIG. 1).

Computing device 510 may also include a reception component 530 for receiving user input. Computing device 510 may further include an analytics component 540 for analyzing goals and categories, and supporting application 110 (shown in FIG. 1). Computing device 510 may further include a generation component 550 for generating a life map. Further, computing device 510 may include a display component 560 for displaying the generated life map on client device 104 (shown in FIG. 1). Computing devices 510 may include additional, less, or alternate functionality, including that discussed elsewhere herein.

Exemplary Generation of a Life Map

Figure 6:
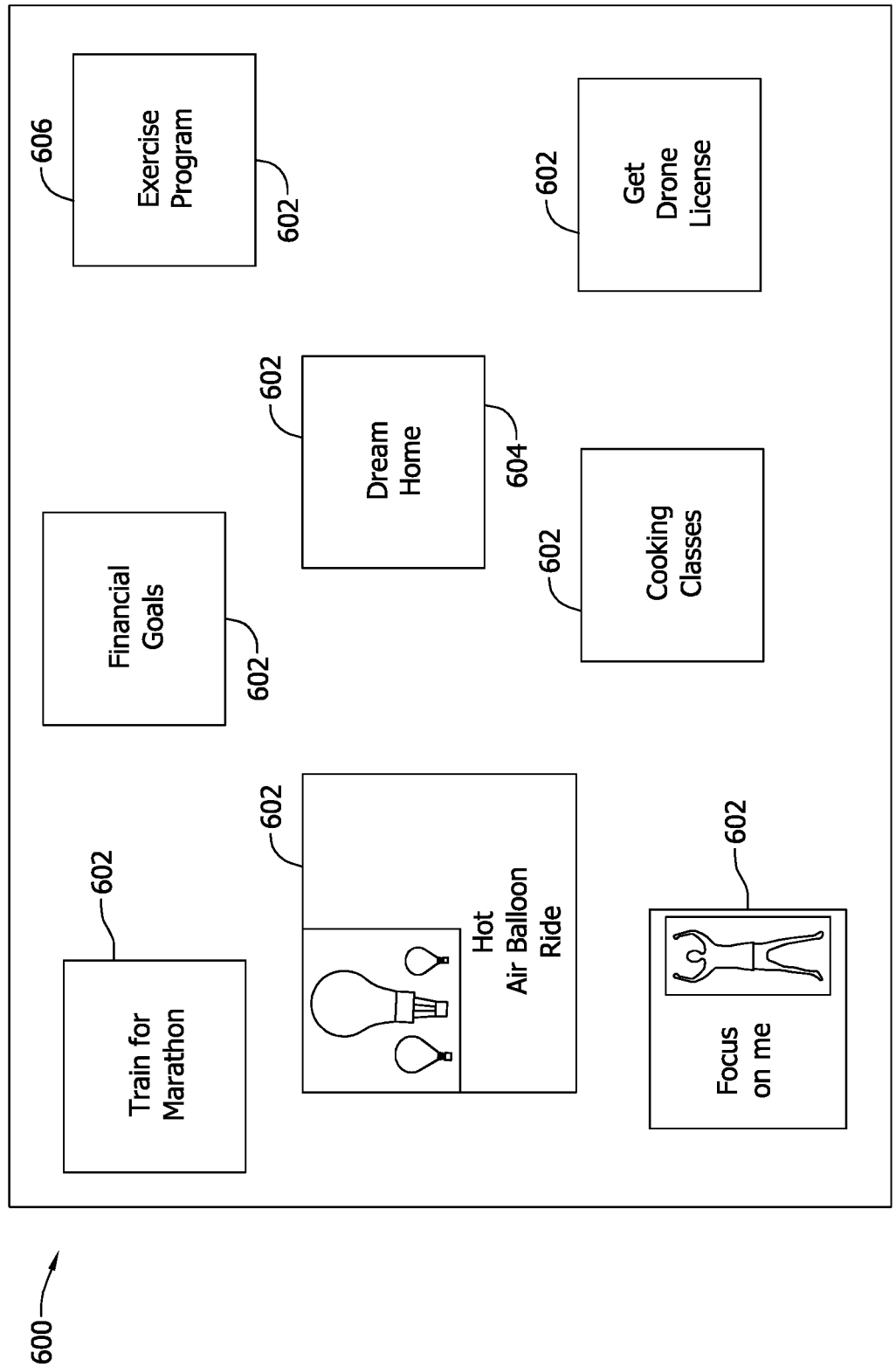
FIG. 6 illustrates an exemplary interactive life map that may be generated using the life plan management computer system shown in FIG. 1.

FIG. 6 illustrates an exemplary interactive life map 600 that may be generated, for example, using the LPMP described herein. Specifically, a consumer may use LPMP to generate, maintain, and update life map 600 that is customized to them. Life map 600 may include a plurality of goals 602 that the consumer would like to achieve. In the example shown in FIG. 6, life map 600 includes a first goal 604 representing the consumer's desire for a dream home, a second goal 606 representing the consumer's desire to participate in an exercise program, and so on. For example and without limitation, goals 602 may further include training for a marathon, going on a hot air balloon ride, focusing on oneself, taking cooking classes, financial goals, getting a drone license, community involvement, education, having a better outlook on life, going on a vacation, finding love, having a flexible lifestyle, etc. This list of goals is intended to be for example purposes only, and is not intended to be limiting in any way.

To generate life map 600, the consumer may access LPM computing device 102 using client device 104 (both shown in FIG. 1). More specifically, the consumer may use application 110 and user interface 112 (both shown in FIG. 1) to interact with LPM computing device 102 to generate life map 600.

In the exemplary embodiment, user interface 112 may display a plurality of predetermined potential goals as goal icons, and allow the consumer to select and drag and drop desired goal icons into a displayed space to generate life map 600. Each goal icon represents a goal 602 for the life map 600. Specifically, when a potential goal icon is selected by being dragged and dropped into the displayed space, that potential goal may become a goal 602 in life map 600 for that consumer. The predetermined potential goals may be stored, for example, in database 118. The user can also use the user interface 112 to select the goal icons in other ways, such as but not limited to, clicking to select, dragging into priority order, and other methods to build the life map 600. The user can select multiple goal icons for addition in the life plan 600, where the LPM computing device 102 will update the life plan 600 based on the selections and deselections of the user.

Further, the consumer may also create goals other than the predetermined potential goals. For example, the consumer may, using user interface 112, input customized goals to be included in life map, and/or may edit predetermined potential goals before inclusion in life map 600. Alternatively, consumers may generate life maps 600 using any suitable interface and/or inputs.

In some embodiments, consumers may prioritize their goals 602 by assigning a ranking or other preference indicator to each goal 602. This may enable LPM computing device 102 to focus on assisting the consumer in achieving high priority goals instead of lower priority goals, allowing LPMP to function as a digital advisor to the consumer.

Exemplary Consumer Actions Using the Life Map

Once life map 600 is generated, the LPM computing device 102 may cause the life map 600 to be displayed to the user on the client device 104. Furthermore, the LPM computing device 102 may connect the consumer with producers and/or products associated with life map 600. In the exemplary embodiment, when life map 600 is generated, LPM computing device 102 may associate each goal 602 in life map 600 with a plurality of categories that may assist the consumer with achieving that goal 602. Further, LPM computing device 102 may associate each category with a plurality of related sub-categories. LPM computing device 102 may also associate each sub-category with one or more producers that provide products within the sub-category. These associations between goals 602, categories, sub-categories, and producers may be stored, for example, in database 118. These associations may be predetermined and/or may be generated dynamically (e.g., using machine learning).

When the consumer selects a particular goal 602 on their life map 600 (e.g., using user interface 112), LPM computing device 102 may retrieve the categories associated with the selected goal 602 and display those categories, where each category may have different producers associated with it. For example, FIG. 7 illustrates an example category display 700 that is generated and displayed when the consumer selects first goal 604.

Figure 7:
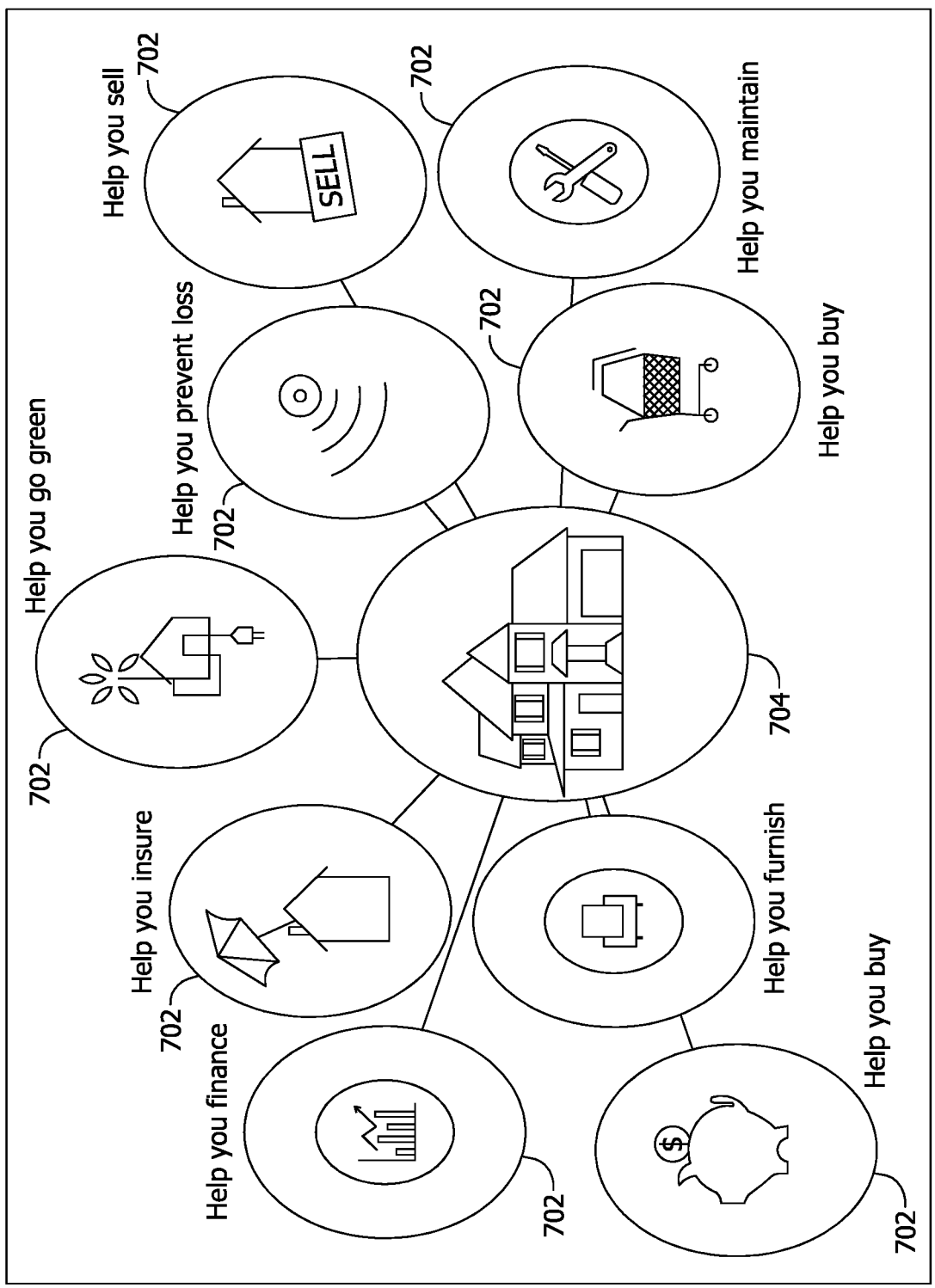
FIG. 7 illustrates an exemplary category display that may be generated using the life plan management computer system shown in FIG. 1.

As shown in FIG. 7, category display 700 may include first goal 704 and a plurality of categories 702 associated with first goal 704. In this example, each displayed category 702 may assist the consumer in fulfilling their first goal 704 of owning a dream home. For example, categories 702 may assist the consumer in financing the dream home, maintaining the dream home, preventing loss related to the dream home, etc. In some embodiments, the categories 702 can include milestones, steps, and/or actions for the consumer to take to achieve the goal. Each milestone may represent the completion of a series of steps and/or actions. The categories 702 can also include information about producers associated with the different steps.

Further, in the exemplary embodiment, when the consumer selects a particular category 702 (e.g., from category display 700) LPM computing device 102 may retrieve the sub-categories associated with the selected category 702 and display those sub-categories. For example, FIG. 8 illustrates an example sub-category display 800 that is generated and displayed when a category 702 related to preventing loss is selected.

Figure 8:
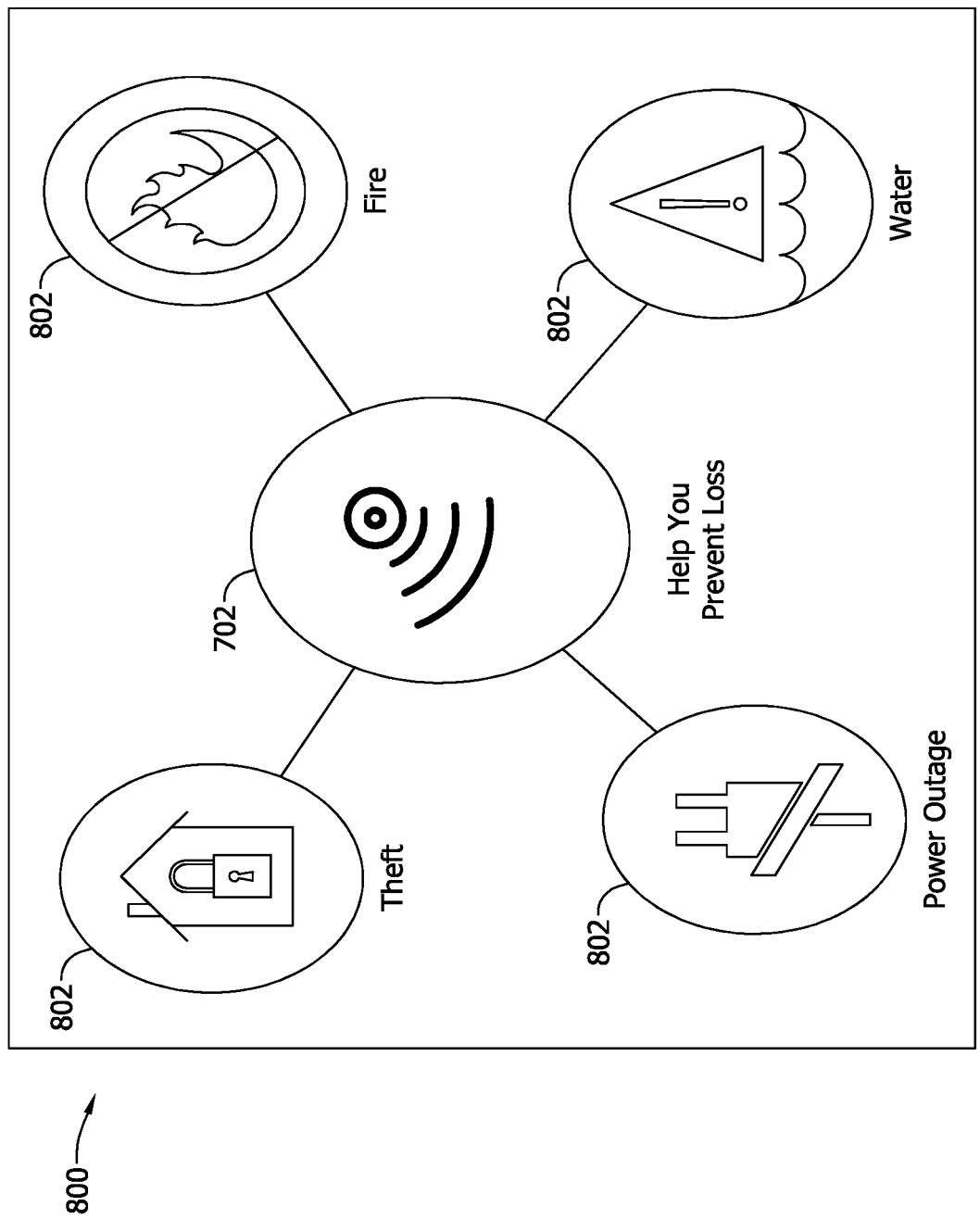
FIG. 8 illustrates an exemplary sub-category display that may be generated using the life plan management computer system shown in FIG. 1.

As shown in FIG. 8, sub-category display 800 may include the selected category 702 and a plurality of sub-categories 802 associated with the selected category 702. In this example, each displayed sub-category 802 may assist the consumer in preventing losses related to their dream home. For example, sub-categories 802 may assist the consumer in preventing loss from theft, fire, power outages, and water.

This hierarchical organization of goals 602, categories 702, and sub-categories 802 may enable consumers to quickly drill down to find producers and products that will help them achieve their goals.

Exemplary Producer and Product Interactions

When the consumer selects a particular sub-category 802 (e.g., from sub-category display 800), in the exemplary embodiment, LPM computing device 102 may retrieve producers associated with the selected sub-category 802 and display those sub-categories. For example, FIG. 9 illustrates an example producer display 900 that is generated and displayed when a sub-category 802 related to preventing losses from theft is selected.

Figure 9:
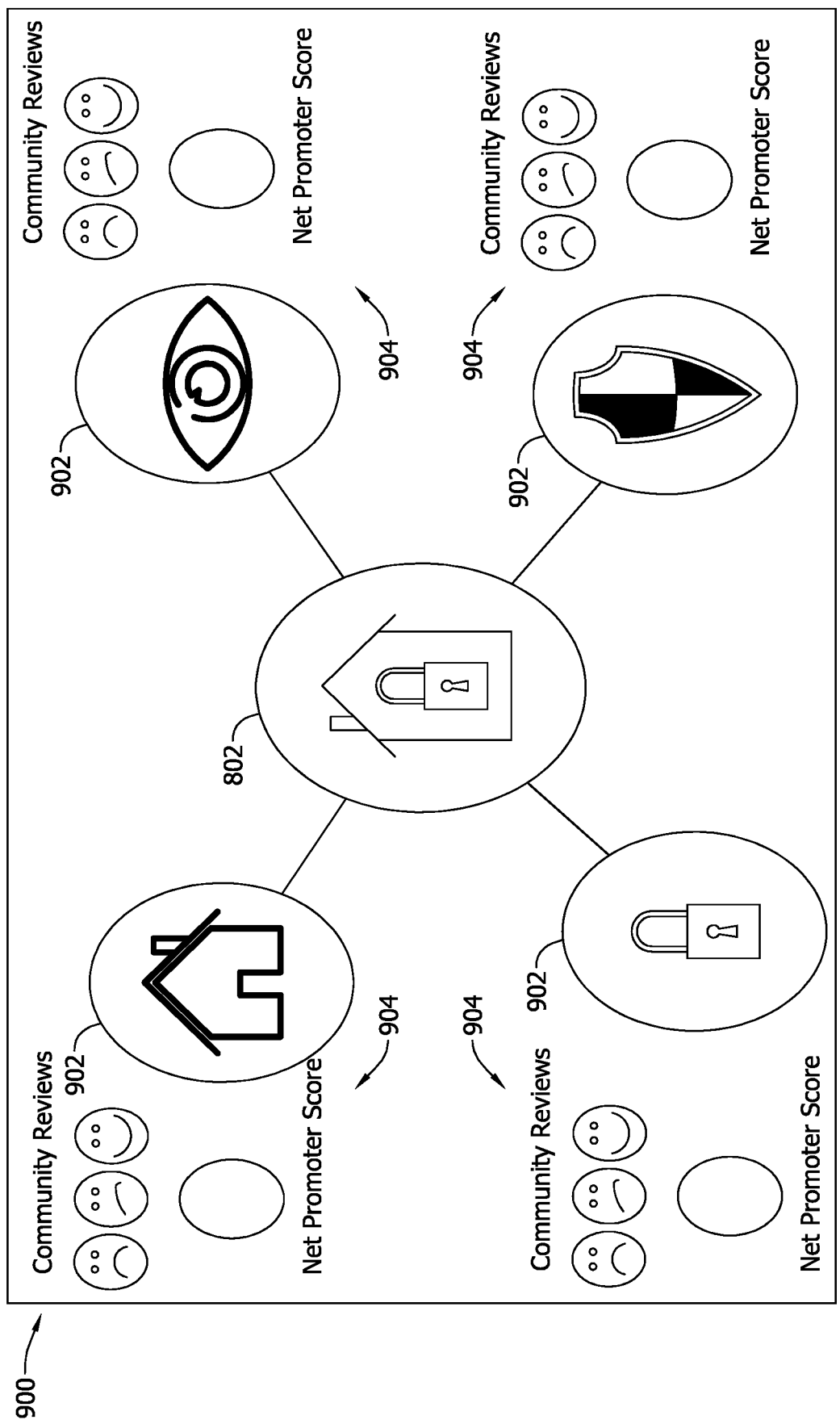
FIG. 9 illustrates an exemplary producer display that may be generated using the life plan management computer system shown in FIG. 1.

As shown in FIG. 9, producer display 900 may include the selected sub-category 802 and a plurality of producers 902 associated with the selected sub-category 802. In this example, each displayed producer 902 may assist the consumer in preventing losses from theft for their dream home. For example, producers 902 may include various entities that offer security products (e.g., home security systems, cameras, door locks, etc.).

In the exemplary embodiment, producer display 900 may also display, in for each producer 902, producer feedback 904 that assists the consumer in selecting a particular producer 902. Producer feedback 904 may include, for example, community reviews of producer 902 and a net promotor score for producer 902 (e.g., retrieved from one or more third party servers, such as third party server 106 (shown in FIG. 1)). Producer feedback 904 may assist the consumer in determining which producer 902 to obtain products from.

Figure 10:
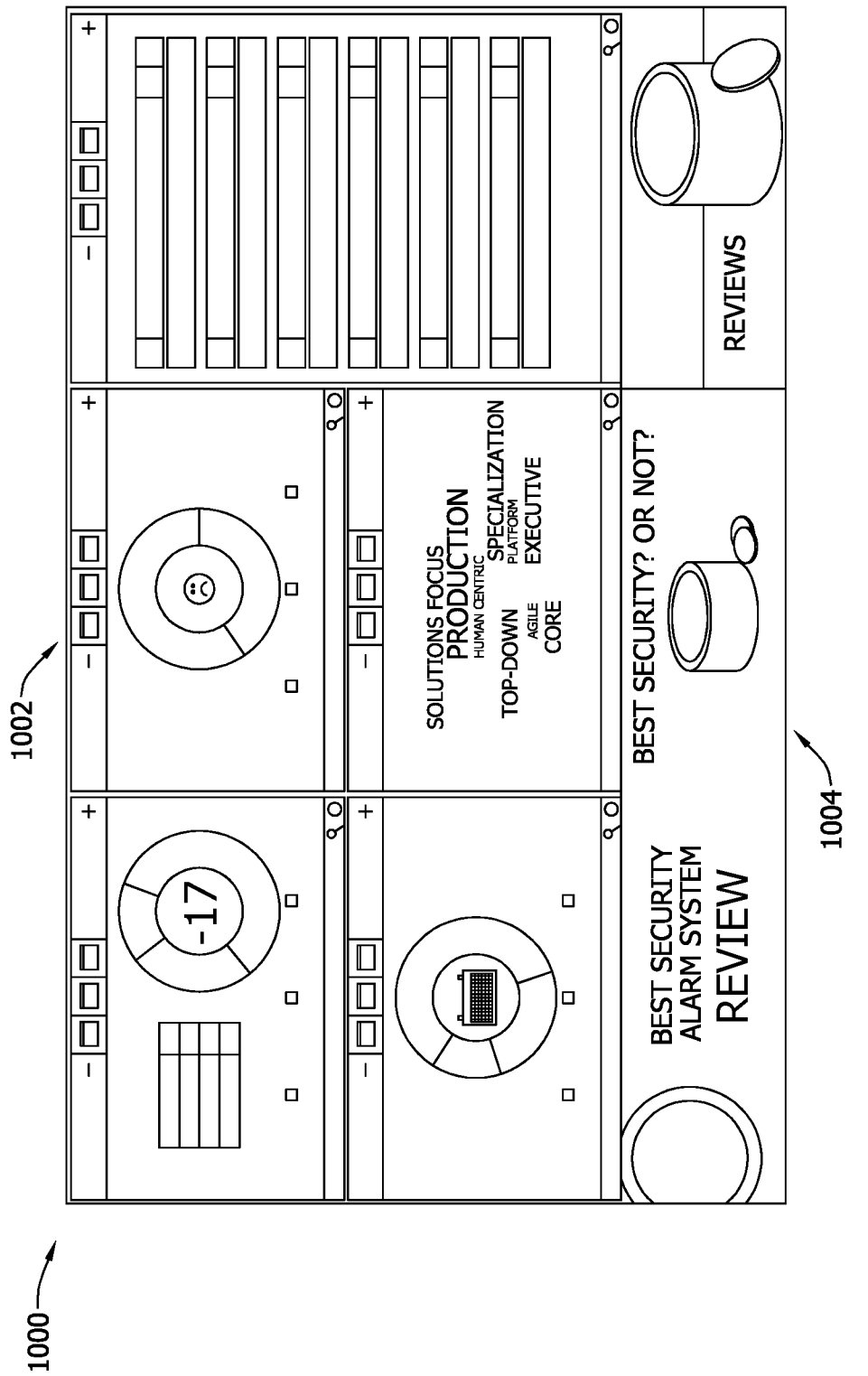
FIG. 10 illustrates an exemplary feedback dashboard that may be generated using the life plan management computer system shown in FIG. 1.

In the exemplary embodiment, LPM computing device 102 may cause user interface 112 to display a feedback dashboard 1000 for one or more producers, as shown in FIG. 10. Feedback dashboard 1000 may be displayed, for example, upon the consumer selecting (e.g., via client device 104) producer feedback 904 for a particular producer 902. Feedback dashboard 1000 may include more detailed feedback information than producer feedback 904 on producer display 900. For example, feedback dashboard 1000 may include a community review panel 1002 including detailed community review information, and an industry review panel 1004 including industry reviews of producer 902. Alternatively, feedback dashboard 1000 may display any type of feedback that may assist the consumer in selecting a producer.

Figure 11:
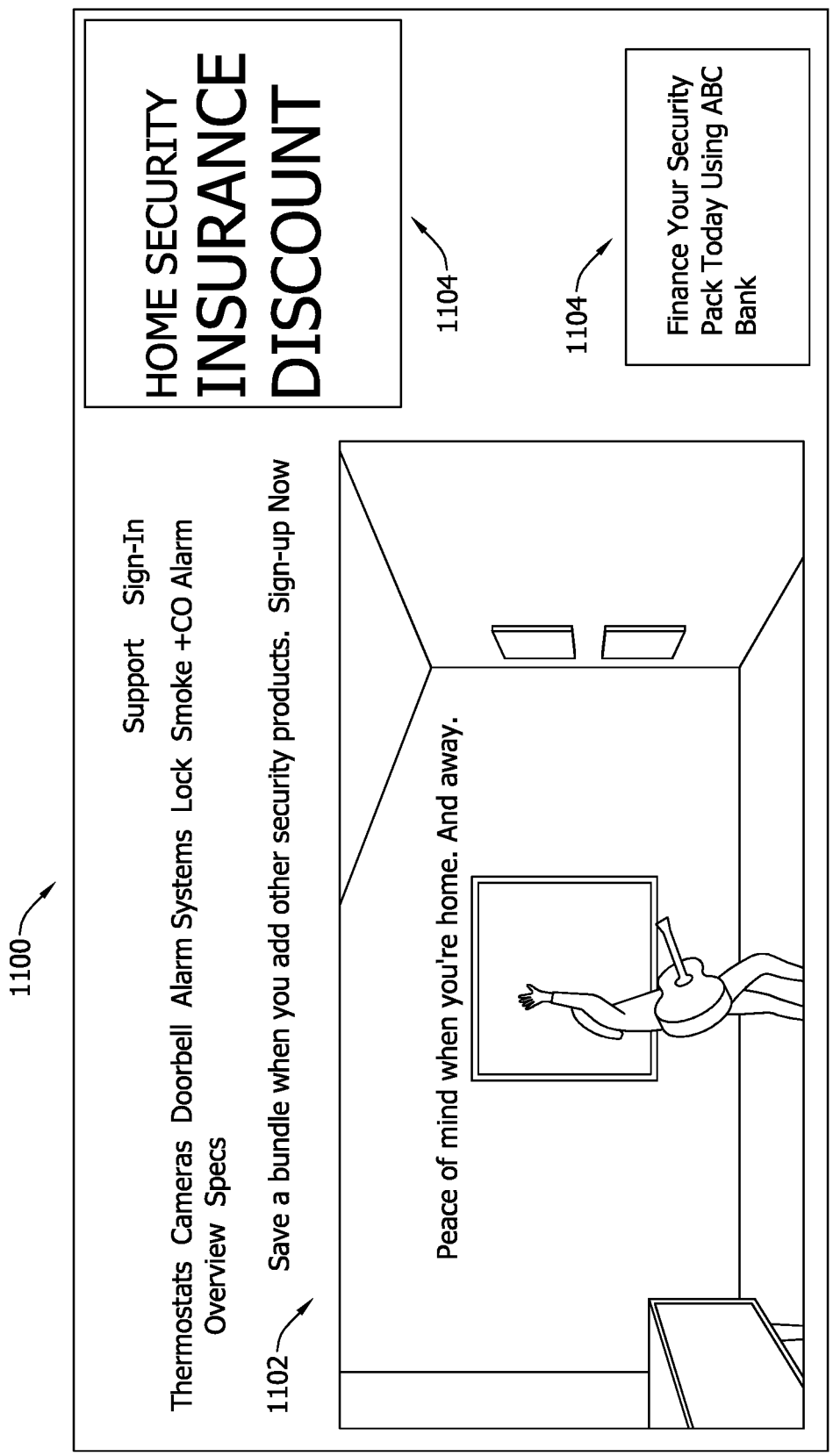
FIG. 11 illustrates an exemplary producer portal that may be generated using the life plan management computer system shown in FIG. 1.

When the consumer selects a particular producer 902, by LPM computing device 102 may cause user interface 112 to display a producer portal 1100, as shown in FIG. 11. Producer portal 1100 may include a marketplace interface 1102 that allows the consumer to purchase products from the producer. For example, the marketplace interface 1102 may be the website of the selected producer. Producer portal 1100 may also include one or more discount offers 1104 for products sold by producers. Accordingly, LPM computing device 102 (via LPMP) may enable the consumer to view feedback for multiple producers, select a producer based on the feedback, and purchase products from the selected producer that assist the consumer in achieving their goals.

In some embodiments, the LPM computing device 102 may generate an appointment for the consumer to meet with a representative of the producer.

Exemplary Avatar Dashboard

Figure 12:
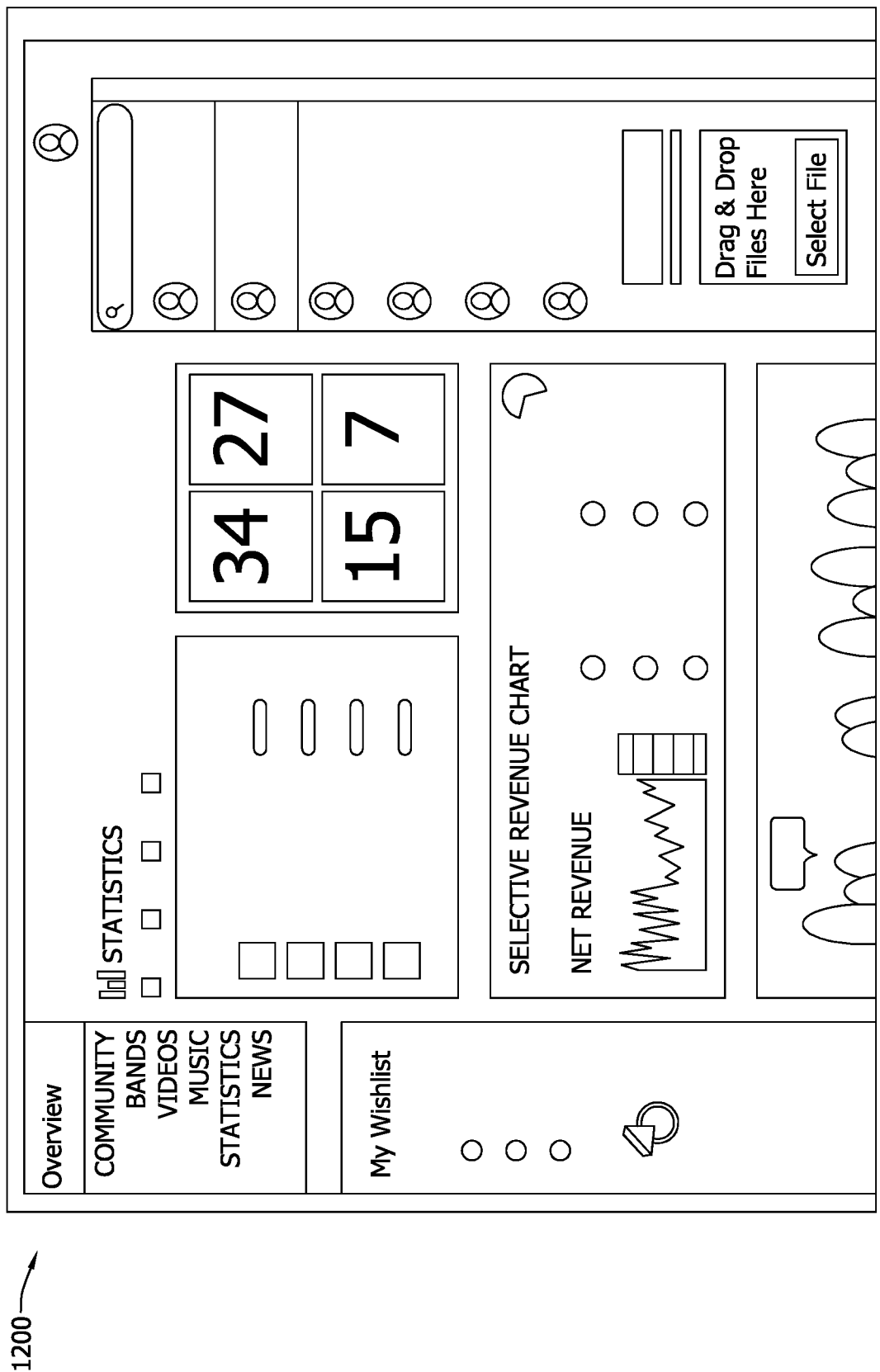
FIG. 12 illustrates an exemplary avatar dashboard that may be generated using the life plan management computer system shown in FIG. 1.

FIG. 12 illustrates an exemplary avatar dashboard 1200 that may be generated, for example, by LPM computing device 102. Avatar dashboard 1200 includes data for a particular consumer, and each consumer using LPMP may access their respective dashboard. For example, avatar dashboard 1200 may display statistics for the consumer, including tracking the consumer's progress towards realizing goals 602 in life map 600.

Avatar dashboard 1200 may also include additional data, such as, but not limited to, spending data, product purchase data, and/or other types of data useful to the consumer in fulfilling their goals. This data may be input by the consumer, retrieved from database 118, and/or retrieved from third part servers 106 (both shown in FIG. 1). By displaying such data, avatar dashboard 1200 may enable the consumer to analyze their own data, and identify issues in their data. For example, upon viewing avatar dashboard 1200, a consumer may determine that if they bring their lunch to work every day, instead of purchasing lunch, they will save $100 a week that can be put towards their dream home. Further, in the exemplary embodiment, the consumer may control and manage what types of data are displayed on avatar dashboard 1200 and how that data is displayed. The LPMP computing device 102 may use the additional data to generate, modify, or update the life map 600.

In some embodiments, the consumer can query LPM computing device 102 for suggestions in achieving their goals. For example, via avatar dashboard 1200, the consumer may ask LPM computing device 102 for a list of suggested actions that will help them purchase their dream home. In response, LPM computing device 102 may apply data aggregation techniques to the consumer's data to generate the list of suggested actions. For example, using machine learning, LPM computing device 102 may review the consumer's spending data, and suggest to the consumer that they bring their lunch to work, and put the savings towards their dream home.

In the exemplary embodiment, LPM computing device 102 may also automatically generate and transmit alerts to the consumer (e.g., through application 110) when the consumer takes an action that impacts realization of one of their goals. For example, if the consumer inputs data indicating that they are planning on going on an international vacation, LPM computing device 102 may automatically generate and send an alert to the consumer notifying them that the international vacation may delay their ability to purchase their dream home. Further, LPM computing device 102 may also send alerts with suggested actions and/or alerts that remind the consumers to work towards their goals. Those of skill in the art will appreciate that LPM computing device 102 may generate multiple different types of alerts to assist consumers in achieving goals. These alerts may be generated, in some embodiments, using machine learning techniques.

Notably, every interaction that a consumer has with the LPMP is an event that LPM computing device 102 can leverage to provide recommendations, alerts, etc. Further, LPM computing device 102 may analyze products purchased (or not purchased) by consumers to identify missing producers or products that would be beneficial to add to the LPMP. The recommendations may include at least one of a checklist, an article, a video, and a testimonial.

In some embodiments, the LPM computing device 102 determines a current position for the consumer in relation to each goal in the LPMP. The LPM computing device 102 can determine that the consumer has completed a milestone, action, and/or step to achieving the goal and transmit notifications to the consumer notifying the consumer of the completed milestone, action, and/or step. The notification can be provided via the avatar dashboard 1200 and/or in a message or one or more signals to the consumer, such as a text message, email, and/or other notification system.

Using avatar dashboard 1200, a consumer can also share their own insights with other consumers on the platform. For example, a first consumer may share with a second consumer that they were able to afford a new car by getting rid of cable television. In another example, a first consumer may recommend a particular home security product to a second consumer. Accordingly, consumers can become producers themselves, as they provide insights and product recommendations to other consumers. Through avatar dashboard 1200, a consumer may also view insights from similar consumers (e.g., consumers with similar goals, spending patterns, etc.).

Figure 13:
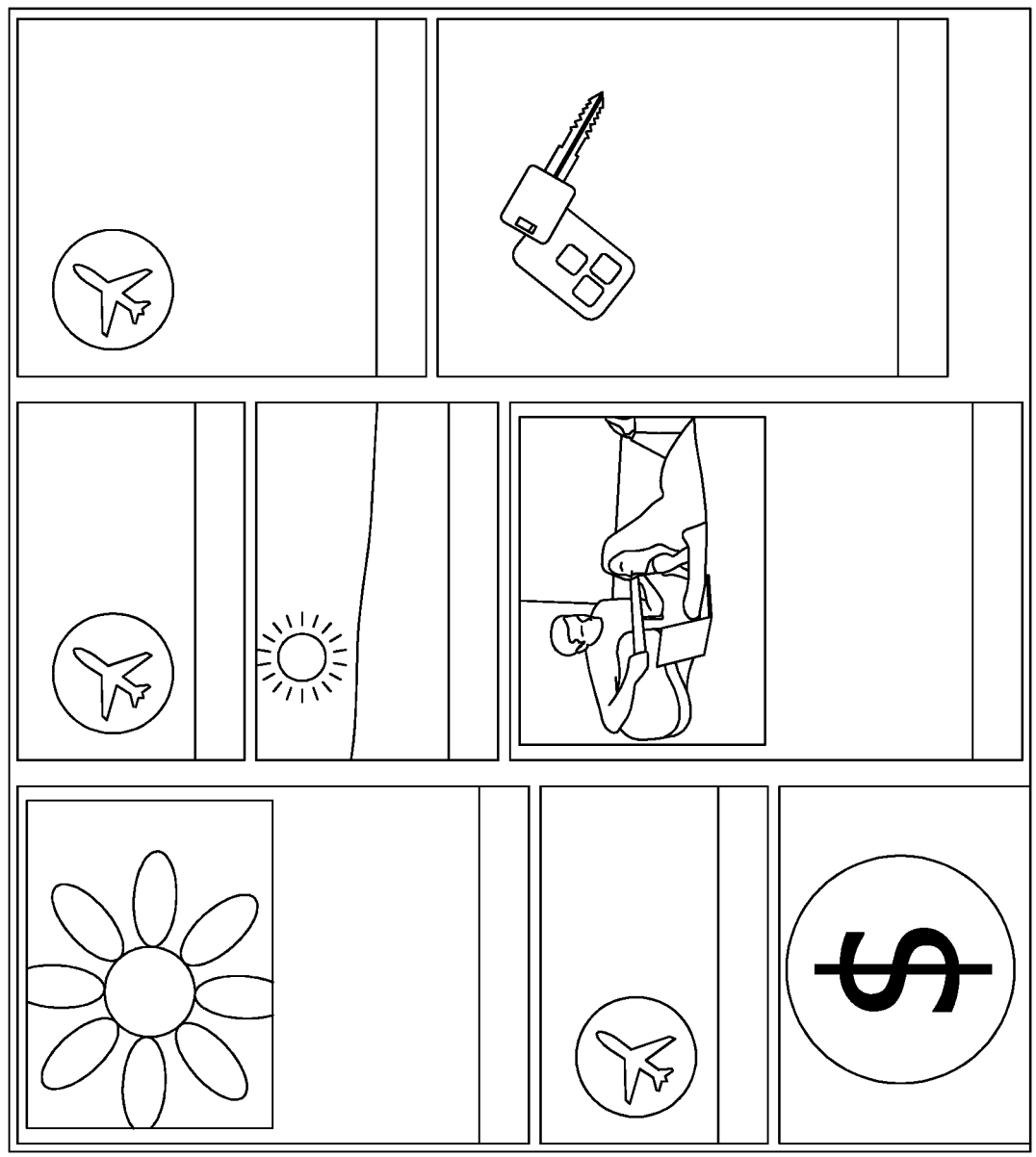
FIG. 13 illustrates an exemplary social media feed that may be generated using the life plan management computer system shown in FIG. 1.

Using LPMP, consumers can also share their insights, goal progress, and other information with family member and friends through a shareable social media feed. For example, FIG. 13 shows an example social media feed 1300 for a consumer that participates in LPMP. In social media feed 1300, the consumer may share goals they've achieved (e.g., the purchase of a new car, taking an international vacation, etc.). Other users may comment or supplement the shared information to further assist the consumer. Further, the consumer may also share insights indicating how they helped achieve those goals.

Exemplary Embodiments

In one embodiment, a life plan management (LPM) computing device for connecting consumers with producers is provided. The LPM computing device is in communication with a client computing device and includes at least one processor in communication with at least one memory device. The at least one processor is programmed to i) receive user input from the client computing device, the user input including at least one goal for the consumer, ii) analyze the at least one goal to determine a plurality of categories associated with the at least one goal, iii) store, in the at least one memory device, the plurality of categories in association with the at least one goal, iv) analyze at least one of the plurality of categories to determine a plurality of producers associated with the at least one category, v) store, in the at least one memory device, the plurality of producers in association with the at least one category, vi) generate an interactive life map for the consumer, the interactive life map including the at least one goal, and enabling the consumer to access the plurality of producers by navigating the life map to select the at least one goal and the at least one category, vii) and cause the interactive life map to be displayed on the client computing device. The LPM computing device may include additional, less, or alternate functionality, including that discussed elsewhere herein.

For instance, the processor may be further programmed to receive spending data from the client computing device, analyze the spending data to determine a suggested consumer action that will increase a likelihood of the consumer fulfilling the at least one goal, generate an alert including the suggested consumer action, and cause the alert to be displayed on the client computing device.

To analyze the at least one goal and at least one of the plurality of categories, the processor may be programmed to analyze the at least one goal and the at least one of the plurality of categories using machine learning.

The at least one goal may be a predetermined goal stored in the at least one memory device. Further, the at least one goal may be a customized goal dynamically generated from the user input.

To analyze at least one of the plurality of categories, the processor may be further configured to analyze at least one of the plurality of categories to determine a plurality of sub-categories associated with the at least one category, and analyze at least one of the plurality of sub-categories to determine the plurality of producers.

The processor may be further configured to retrieve producer feedback associated with each of the plurality of producers, and cause the producer feedback for each producer to be displayed in association with the producer on the client device. The producer feedback may include community reviews and a net promotor score.

The processor may be further configured to generate a feedback dashboard for at least one producer of the plurality of producers, the feedback dashboard including a community review panel and an industry review panel, and cause the feedback dashboard to be displayed on the client computing device.

The processor may be further configured to generate a producer portal for at least one producer of the plurality of producers, the producer portal including a marketplace interface that allows the consumer to purchase products from the producer, and cause the producer portal to be displayed on the client computing device.

The processor may be further configured to generate an avatar dashboard for the consumer, the avatar dashboard including statistics associated with the life map of the consumer, and cause the avatar dashboard to be displayed on the client computing device. The statistics may include at least one of i) consumer progress towards realizing the at least one goal, ii) consumer spending data, iii) and consumer product purchase data. The avatar dashboard may allow the consumer to generate and share insights with other consumers.

The processor may be further configured to allow the consumer to share a social media feed that includes data associated with the life plan of the consumer.

In another embodiment, a computer-implemented method for connecting consumers with producers is implemented using a life plan management (LPM) computing device in communication with a client computing device. The LPM computing device includes at least one processor in communication with at least one memory device. The method includes i) receiving user input from the client computing device, the user input including at least one goal for the consumer, ii) analyzing the at least one goal to determine a plurality of categories associated with the at least one goal, iii) storing, in the at least one memory device, the plurality of categories in association with the at least one goal, iv) analyzing at least one of the plurality of categories to determine a plurality of producers associated with the at least one category, v) storing, in the at least one memory device, the plurality of producers in association with the at least one category, vi) generating an interactive life map for the consumer, the interactive life map including the at least one goal, and enabling the consumer to access the plurality of producers by navigating the life map to select the at least one goal and the at least one category, and vii) causing the interactive life map to be displayed on the client computing device. The method may include additional, less, or alternate actions, including those discussed elsewhere herein.

For instance, the method may further include receiving spending data from the client computing device, analyzing the spending data to determine a suggested consumer action that will increase a likelihood of the consumer fulfilling the at least one goal, generating an alert including the suggested consumer action, and causing the alert to be displayed on the client computing device.

Analyzing the at least one goal and at least one of the plurality of categories may include analyzing the at least one goal and the at least one of the plurality of categories using machine learning.

The at least one goal may be a predetermined goal stored in the at least one memory device. Further, the at least one goal may be a customized goal dynamically generated from the user input.

Analyzing at least one of the plurality of categories may include analyzing at least one of the plurality of categories to determine a plurality of sub-categories associated with the at least one category, and analyzing at least one of the plurality of sub-categories to determine the plurality of producers.

The method may further include retrieving producer feedback associated with each of the plurality of producers, and causing the producer feedback for each producer to be displayed in association with the producer on the client device. The producer feedback may include community reviews and a net promotor score.

The method may further include generating a feedback dashboard for at least one producer of the plurality of producers, the feedback dashboard including a community review panel and an industry review panel, and causing the feedback dashboard to be displayed on the client computing device.

The method may further include generating a producer portal for at least one producer of the plurality of producers, the producer portal including a marketplace interface that allows the consumer to purchase products from the producer, and causing the producer portal to be displayed on the client computing device.

The method may further include generating an avatar dashboard for the consumer, the avatar dashboard including statistics associated with the life map of the consumer, and causing the avatar dashboard to be displayed on the client computing device. The statistics may include at least one of i) consumer progress towards realizing the at least one goal, ii) consumer spending data, iii) and consumer product purchase data. The avatar dashboard may allow the consumer to generate and share insights with other consumers.

The method may further include sharing a social media feed that includes data associated with the life plan of the consumer.

In a further embodiment, a life plan management (LPM) computing device is provided. The LPM computing device includes at least one processor in communication with at least one memory device. The LPM computing device is in communication with a client computing device. The at least one processor is programmed to i) cause a plurality of goal icons to be displayed on the client computing device, where each goal icon of the plurality of goal icons is associated with a goal of a plurality of goals, ii) receive user input from the client computing device, the user input including at least one goal icon selected by a consumer associated with the client computing device, iii) determine at least one goal associated with the selected at least one goal icon; iv) generate an interactive life plan for the consumer, the life plan including the at least one goal, and one or more steps for the consumer to achieve the at least one goal; and v) cause the interactive life plan to be displayed on the client computing device. The LPM computing device may include additional, less, or alternate functionality, including that discussed elsewhere herein.

For instance, the processor may be further programmed to receive a second user input from the client computing device. The second user input including a user selection of a second goal icon. The processor may also be programmed to determine the selected goal associated with the second goal icon and adjust the life plan based on the selected goal.

The processor may be further programmed to determine a producer associated with one goal in the life plan and enable the consumer to access the producer via the client computing device. Additionally, the processor may be programmed to display a plurality of producers associated with the one goal in the life plan, wherein the consumer is able to select one or more producers of the plurality of producers. Furthermore, the processor may be programmed to generate an appointment between the consumer and the producer.

The processor may be further programmed to determine a plurality of steps associated with each goal in the life plan and store the plurality of steps in the life plan. Additionally, the processor may be further programmed to determine a current position for the consumer for each goal in the life plan. Furthermore, the processor may be further programmed to determine that the consumer has completed a step based on the current position for the consumer with the corresponding goal and cause a notification to be displayed on the client computing device that the consumer has completed the step. Moreover, the processor may be programmed to receive one or more signals indicating that the consumer has completed the step.

The processor may be further programmed to receive additional data about the consumer and generate the life plan based on the at least one goal specified by the consumer and the additional data. Additionally, the processor may be programmed to receive spending data from the client computing device, analyze the spending data to determine a suggested consumer action that will increase a likelihood of the consumer fulfilling the at least one goal, generate an alert including the suggested consumer action, and cause the alert to be displayed on the client computing device.

The processor may be further programmed to receive a user input on a goal in the interactive life plan and cause one or more steps of the goal to be displayed in response to the user input.

The processor may be further programmed to receive a user input indicating a first priority of a first goal and a second priority of a second goal of the interactive life plan and cause the display of the one or more steps of the first goal to be displayed in relation to the one or more steps of the second goal based on the first priority and the second priority.

The processor may be further programmed to cause recommendations to be displayed on the client computing device to assist the consumer to achieve at least one goal of the life plan, the recommendations include at least one of a checklist, an article, a video, and a testimonial.

In still further embodiment, a computer-implemented method for connecting consumers with producers is provided. The method is implemented using a life plan management (LPM) computing device including at least one processor in communication with at least one memory device. The LPM computing device is in communication with a client computing device. The method includes i) causing a plurality of goal icons to be displayed on the client computing device, where each goal icon of the plurality of goal icons is associated with a goal of a plurality of goals, ii) receiving user input from the client computing device, the user input including at least one goal icon selected by a consumer associated with the client computing device, iii) determining at least one goal associated with the selected at least one goal icon, iv) generating an interactive life plan for the consumer, the life plan including the at least one goal, and one or more steps for the consumer to achieve the at least one goal, and v) causing the interactive life plan to be displayed on the client computing device. The method may include additional, less, or alternate actions, including those discussed elsewhere herein.

For instance, the method may further include receiving a second user input from the client computing device. The second user input including a user selection of a second goal icon. The method may also include determining the selected goal associated with the second goal icon and adjusting the life plan based on the selected goal.

The method may further include determining a producer associated with one goal in the life plan and enabling the consumer to access the producer via the client computing device. Additionally, the method may include displaying a plurality of producers associated with the one goal in the life plan, wherein the consumer is able to select one or more producers of the plurality of producers. Furthermore, the method may include generating an appointment between the consumer and the producer.

The method may further include determining a plurality of steps associated with each goal in the life plan, storing the plurality of steps in the life plan, determining a current position for the consumer for each goal in the life plan, determining that the consumer has completed a step based on the current position for the consumer with the corresponding goal, and causing a notification to be displayed on the client computing device that the consumer has completed the step.

Machine Learning & Other Matters

The computer systems and computer-implemented methods discussed herein may include additional, less, or alternate actions and/or functionalities, including those discussed elsewhere herein. The computer systems may include or be implemented via computer-executable instructions stored on non-transitory computer-readable media. The methods may be implemented via one or more local or remote processors, transceivers, servers, and/or sensors (such as processors, transceivers, servers, and/or sensors mounted on mobile computing devices, or associated with smart infrastructure or remote servers), and/or via computer executable instructions stored on non-transitory computer-readable media or medium.

In some embodiments, a life plan management (LPM) computing device may implement machine learning, such that the LPM computing device "learns" to analyze, organize, and/or process data without being explicitly programmed. Machine learning may be implemented through machine learning methods and algorithms ("ML methods and algorithms"). In an exemplary embodiment, a machine learning module ("ML module") is configured to implement ML methods and algorithms. In some embodiments, ML methods and algorithms are applied to data inputs and generate machine learning outputs ("ML outputs"). Data inputs may include but are not limited to: goal data, consumer spending data, consumer purchase data, consumer insights, third party data, etc. ML outputs may include but are not limited to: generated categories and/or sub-categories, consumer alerts, consumer recommendations, product recommendations, identified gaps in currently available producers/products, etc. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. For example, a ML module may receive training data comprising goal data with a consumer. The ML module may then generate a plurality of categories associated with each goal, a plurality of sub-categories associated with each category, and a plurality of producers associated with each sub-category. The ML module may then generate an interactive life map for the consumer based on this data.

In another embodiment, an ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above. For example, a ML module may receive unlabeled data comprising goal data, consumer spending data, and consumer purchase data. The ML module may employ an unsupervised learning method such as "clustering" to identify patterns and organize the unlabeled data into meaningful groups. The newly organized data may be used, for example, to recommend actions that a consumer can take to help achieve their goals.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

The reward signal definition may be based upon any of the data inputs or ML outputs described above. For example, a ML module may implement reinforcement learning in generating life maps for users. The ML module may utilize a decision-making model to generate data for consumers based upon their goal data, and may further receive user-satisfaction data indicating a level of satisfaction experienced by a consumer regarding the interactive life map generated for them. A reward signal may be generated based on the user-satisfaction data. Using upon the reward signal, the ML module may update the decision-making model such that subsequently generated life maps more accurately predict user satisfaction.

Additional Considerations

With the foregoing, consumers are connected to producers and products that may help them achieve their goals. The systems and methods described herein may also automatically determine suggested actions to help the consumer, and provide those suggested actions to the consumer as alerts. Accordingly, the systems and methods described herein ensure that consumers are quickly connected with producers and products that will assist them in realizing their goals.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

In some embodiments, registration of users for the life plan management platform includes opt-in informed consent of users to data usage consistent with consumer protection laws and privacy regulations. In some embodiments, the collected data may be anonymized and/or aggregated prior to receipt such that no personally identifiable information (PII) is received. In other embodiments, the system may be configured to receive registration data and/or other collected data that is not yet anonymized and/or aggregated, and thus may be configured to anonymize and aggregate the data. In such embodiments, any PII received by the system is received and processed in an encrypted format, or is received with the consent of the individual with which the PII is associated. In situations in which the systems discussed herein collect personal information about individuals, or may make use of such personal information, the individuals may be provided with an opportunity to control whether such information is collected or to control whether and/or how such information is used. In addition, certain data may be processed in one or more ways before it is stored or used, so that personally identifiable information is removed.

As used herein, an element or step recited in the singular and proceeded with the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A life plan management (LPM) computing device comprising at least one processor in communication with at least one memory device, the LPM computing device in communication with a consumer computing device associated with a consumer and a producer computing device associated with a producer, wherein the producer is a provider of goods or services, and including, the at least one processor programmed to:

receive, from the consumer computing device associated with the consumer, a request from the consumer for generating an interactive life plan including at least one goal;

transmit, to the consumer computing device, executable instructions to cause a plurality of goal icons to be displayed on the consumer computing device, wherein each goal icon of the plurality of goal icons is associated with a goal of a plurality of goals including the at least one goal;

receive user input from the consumer computing device, the user input including at least one goal icon selected by the consumer associated with the consumer computing device;

determine at least one goal associated with the selected at least one goal icon;

generate the interactive life plan for the consumer, the life plan including the at least one goal, and one or more steps for the consumer to achieve the at least one goal;

transmit, to the consumer computing device, executable instructions to cause the interactive life plan to be displayed on the consumer computing devices;

determine a producer associated with one goal in the life plan;

generate an appointment scheduled between the consumer and the producer of the plurality of producers; and transmit an appointment message representing the generated appointment to the consumer computing device and the producer computing device for storing on said devices.

2. The LPM computing device of claim 1, wherein the at least one processor is further programmed to:

receive a second user input from the consumer via the consumer computing device, the second user input including a user selection of a second goal icon;

determine the selected goal associated with the second goal icon by performing a lookup in the at least one memory device using the second goal icon; and adjust the life plan based on the selected goal.

3. The LPM computing device of claim 1, wherein the at least one processor is further programmed to:

enable the consumer to access the producer via the consumer computing device by causing a link associated with the producer to be displayed on the consumer computing device.

4. The LPM computing device of claim 3, wherein the at least one processor is further programmed to display a plurality of producers associated with the one goal in the life plan, wherein the consumer is able to select one or more producers of the plurality of producers.

5. The LPM computing device of claim 1, wherein the at least one processor is further programmed to:

determine a plurality of steps associated with each goal in the life plan; and store the plurality of steps in the life plan.

6. The LPM computing device of claim 5, wherein the at least one processor is further programmed to determine a current status for the consumer for completing each goal in the life plan.

7. The LPM computing device of claim 6, wherein the at least one processor is further programmed to:

determine that the consumer has completed a step based on the current status for the consumer with the corresponding goal; and cause a notification to be displayed on the consumer computing device that the consumer has completed the step.

8. The LPM computing device of claim 7, wherein the at least one processor is further programmed to receive one or more signals indicating that the consumer has completed the step.

9. The LPM computing device of claim 1, wherein the at least one processor is further programmed to:
receive additional data about the consumer; and
generate the life plan based on the at least one goal specified by the consumer and the additional data.

10. The LPM computing device of claim 9, wherein the additional data about the consumer includes spending data, and wherein the at least one processor is further programmed to:
receive spending data from the consumer computing device;
analyze the spending data to determine a suggested consumer action that will increase a likelihood of the consumer fulfilling the at least one goal;
generate an alert including the suggested consumer action; and
cause the alert to be displayed on the consumer computing device.

11. The LPM computing device of claim 1, wherein the at least one processor is further programmed to:
receive a user input on a goal of the at least one goal in the interactive life plan; and
cause one or more steps of the goal to be displayed in response to the user input.

12. The LPM computing device of claim 1, wherein the at least one processor is further programmed to:
receive, from the consumer computing device, a user input indicating a first priority of a first goal and a second priority of a second goal of the interactive life plan; and
cause, the display of the consumer computing device, to display the one or more steps of the first goal to be displayed in relation to the one or more steps of the second goal based on the first priority and the second priority.

13. The LPM computing device of claim 1, wherein the at least one processor is further programmed to cause recommendations to be displayed on the consumer computing device to assist the consumer to achieve at least one goal of the life plan, wherein the recommendations include at least one of a checklist, an article, a video, and a testimonial.

14. A computer-implemented method for life plan management, the method implemented using a life plan management (LPM) computing device comprising at least one processor in communication with at least one memory device, the LPM computing device in communication with a consumer computing device associated with a consumer and a producer computing device associated with a producer, wherein the producer is a provider of goods or services, and including at least one processor in communication with at least one memory device, the method comprising:
receiving, from the consumer computing device, a request from the consumer for generating an interactive life plan including at least one goal;
transmitting, to the consumer computing device, executable instructions to cause a plurality of goal icons to be displayed on the consumer computing device, wherein each goal icon of the plurality of goal icons is associated with a goal of a plurality of goals including the at least one goal;
receiving user input from the consumer computing device, the user input including at least one goal icon selected by the consumer associated with the consumer computing device;
determining at least one goal associated with the selected at least one goal icon;
generating the interactive life plan for the consumer, the life plan including the at least one goal, and one or more steps for the consumer to achieve the at least one goal;
transmit, to the consumer computing device, executable instructions to cause the interactive life plan to be displayed on the consumer computing device;
determining a producer associated with one goal in the life plan;
generating an appointment scheduled between the consumer and the producer of the plurality of producers; and
transmitting an appointment message represented the generated appointment to the consumer computing device and the producer computing device for storing on said devices.

15. The method of claim 14 further comprising:
receiving a second user input from the consumer via the consumer computing device, the second user input including a user selection of a second goal icon;
determining the selected goal associated with the second goal icon; and
adjusting the life plan based on the selected goal.

16. The method of claim 14 further comprising:
enabling the consumer to access the producer via the consumer computing device by causing a link associated with the producer to be displayed on the consumer computing device.

17. The method of claim 16 further comprising displaying a plurality of producers associated with the one goal in the life plan, wherein the consumer is able to select one or more producers of the plurality of producers.

18. The method of claim 14 further comprising:
determining a plurality of steps associated with each goal in the life plan;
storing the plurality of steps in the life plan;
determining a current status for the consumer for completing each goal in the life plan;
determining that the consumer has completed a step based on the current status for the consumer with the corresponding goal; and
causing a notification to be displayed on the consumer computing device that the consumer has completed the step.

19. The method of claim 14 further comprising:
receiving additional data about the consumer; and
generating the life plan based on the at least one goal specified by the consumer and the additional data.

20. The method of claim 19, wherein the additional data about the consumer includes spending data and the method further comprises:
analyzing the spending data to determine a suggested consumer action that will increase a likelihood of the consumer fulfilling the at least one goal;
generating an alert including the suggested consumer action; and
causing the alert to be displayed on the consumer computing device.

* * * * *